US012035105B2

(12) United States Patent
Jin et al.

(10) Patent No.: US 12,035,105 B2
(45) Date of Patent: Jul. 9, 2024

(54) APPARATUS

(71) Applicant: LG Display Co., Ltd., Seoul (KR)

(72) Inventors: SangWoo Jin, Paju-si (KR); Minjung Kim, Paju-si (KR); Jaewon Hwang, Paju-si (KR); Jaeyoung Lim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 124 days.

(21) Appl. No.: 17/947,852

(22) Filed: Sep. 19, 2022

(65) Prior Publication Data

US 2023/0179926 A1 Jun. 8, 2023

(30) Foreign Application Priority Data

Dec. 6, 2021 (KR) ........................ 10-2021-0173132

(51) Int. Cl.
*H04R 17/00* (2006.01)
*H04R 1/02* (2006.01)
*H04R 1/40* (2006.01)

(52) U.S. Cl.
CPC ............. *H04R 17/00* (2013.01); *H04R 1/028* (2013.01); *H04R 1/403* (2013.01); *H04R 2499/15* (2013.01)

(58) Field of Classification Search
CPC ......... H04R 17/00; H04R 1/028; H04R 1/403
See application file for complete search history.

(56) References Cited

U.S. PATENT DOCUMENTS 10,531,171 B2 * 1/2020 Choi ...................... H04R 1/028
11,190,882 B2 * 11/2021 Zhu ........................ H04R 1/028
11,622,181 B2 * 4/2023 Won ........................ H10K 59/00 381/333
11,849,281 B2 * 12/2023 Kim ........................ H04R 17/00
2013/0167881 A1 * 7/2013 Korbler ................ H10N 30/092 29/25.35
2014/0118910 A1 * 5/2014 Sung ................. G02F 1/133305 361/679.01
2015/0341714 A1 11/2015 Ahn et al.
2019/0028669 A1 1/2019 Shin et al.
2019/0045286 A1 * 2/2019 Kim ........................ H04R 17/00
2020/0213768 A1 * 7/2020 Lee .......................... H04R 3/12
2020/0233629 A1 * 7/2020 Yeon ..................... G06F 1/1626

(Continued)

FOREIGN PATENT DOCUMENTS

JP 2015-219528 A 12/2015
JP 2020-171013 A 10/2020
JP 2021-164165 A 10/2021

OTHER PUBLICATIONS

Office Action issued in corresponding Japanese Patent Application No. 2022-162049 dated Nov. 27, 2023.

*Primary Examiner* — Olisa Anwah

(74) *Attorney, Agent, or Firm* — Morgan, Lewis & Bockius LLP

(57) ABSTRACT

An apparatus includes a vibration member, a vibration apparatus at a rear surface of the vibration member and configured to vibrate the vibration member, and a curved supporting member between the vibration member and the vibration apparatus, wherein the curved supporting member includes a first surface adjacent to the vibration apparatus and a second surface opposite to the first surface, and the first surface includes a curved surface.

25 Claims, 12 Drawing Sheets

B-B'

(56) References Cited

U.S. PATENT DOCUMENTS

| | | | |
|---|---|---|---|
| 2020/0319842 A1 | 10/2020 | Lee et al. | |
| 2021/0124423 A1* | 4/2021 | Fan | G06F 1/1652 |
| 2021/0306741 A1 | 10/2021 | Kim et al. | |
| 2022/0238787 A1* | 7/2022 | Kagawa | H10N 30/883 |

* cited by examiner

APPARATUS

CROSS-REFERENCE TO RELATED APPLICATIONS

This application claims the benefit of the Korean Patent Application No. 10-2021-0173132 filed on Dec. 6, 2021, which is hereby incorporated by reference as if fully set forth herein.

BACKGROUND

Technical Field

The present disclosure relates to an apparatus, and more particularly, to an apparatus for outputting a sound.

Discussion of the Related Art

Apparatuses include a separate speaker or sound apparatus, for providing a sound. When a speaker is provided in an apparatus, a problem occurs where the design and space arrangement of the apparatus are limited due to a space occupied by the speaker.

A speaker applied to apparatuses may be, for example, an actuator including a magnet and a coil. However, when an actuator is applied to an apparatus, there is a drawback where a thickness is thick. Piezoelectric devices for implementing a thin thickness are attracting much attention.

Due to a fragile characteristic, piezoelectric devices are easily damaged due to an external impact, causing a problem where the reliability of sound reproduction is low. Also, when a speaker such as a piezoelectric device is applied to a flexible apparatus, there is a problem where damage occurs due to a fragile characteristic.

SUMMARY

Accordingly, the inventors have recognized problems described above and have performed various experiments for implementing a vibration apparatus which may enhance the quality of a sound and a sound pressure level characteristic. Through the various experiments, the inventors have invented a new vibration apparatus and an apparatus including the same, which may enhance the quality of a sound and a sound pressure level characteristic.

Accordingly, embodiments of the present disclosure are directed to an apparatus that substantially obviates one or more of the problems due to limitations and disadvantages of the related art.

An aspect of the present disclosure is to provide an apparatus that may vibrate a vibration object to generate a vibration or a sound and may enhance a sound characteristic and/or a sound pressure level characteristic.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, an apparatus may comprise a vibration member, a vibration apparatus at a rear surface of the vibration member and configured to vibrate the vibration member, and a curved supporting member between the vibration member and the vibration apparatus. The curved supporting member includes a first surface adjacent to the vibration apparatus and a second surface opposite to the first surface, and the first surface includes a curved surface.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
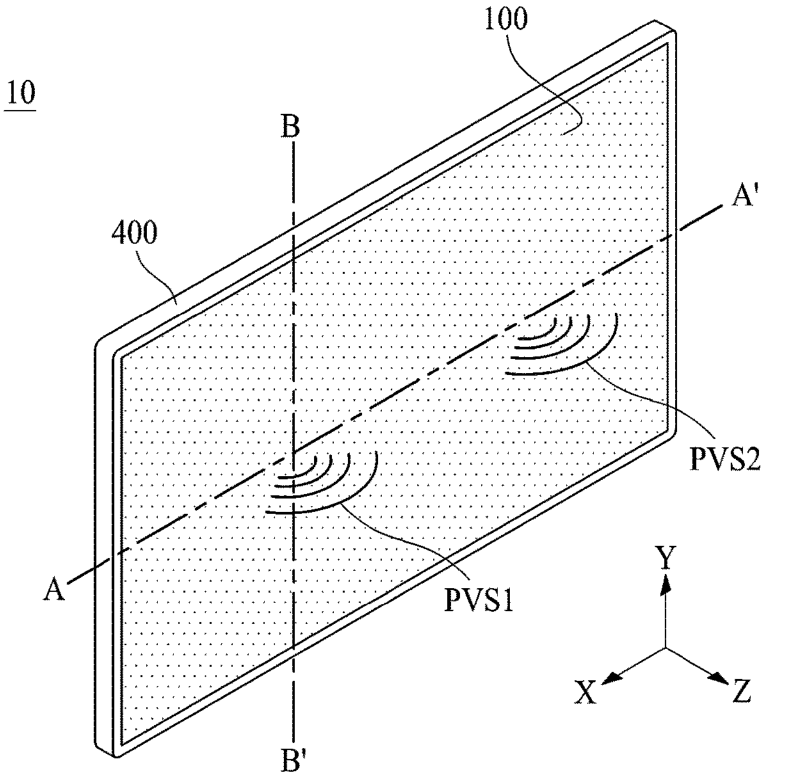
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals refer to like elements throughout unless stated otherwise. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and completely convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, embodiments of the present disclosure are not limited to the illustrated details. Like reference numerals refer to like elements throughout the specification. In the following description, when the detailed description of the relevant known function or configuration is determined to unnecessarily obscure the important point of the present disclosure, the detailed description will be omitted.

When the terms "comprise," "have," and "include," "contain," "constitute," "make up of," "formed of," and the like are used, one or more other elements may be added unless the term, such as "only" is used. The terms of a singular form may include plural forms unless the context clearly indicates otherwise.

In construing an element, the element is construed as including an error range even where no explicit description is provided.

In describing a position relationship, for example, when the position relationship is described using "on," "over," "under," "above," "below," "beneath," "near," "close to," or "adjacent to," "beside," "next to," or the like, one or more portions may be arranged between two other portions unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "front," "rear," "left," "right," "top," "bottom, "downward," "upward," "upper," "lower," and the like refer to an arbitrary frame of reference.

In describing a temporal relationship, for example, when the temporal order is described as "after," "subsequent," "next," "before," "prior to," or the like, a case which is not continuous may be included unless a more limiting term, such as "just," "immediate(ly)," or "direct(ly)" is used.

It will be understood that, although the terms "first," "second," "A," "B," "(a)," "(b)," or the like may be used herein to describe various elements, these elements should not be limited by these terms. These terms are only used to partition one element from another. For example, a first element could be termed a second element, and, similarly, a second element could be termed a first element, without departing from the scope of the present invention.

The terms "first horizontal axis direction," "second horizontal axis direction," and "vertical axis direction" should not be interpreted only based on a geometrical relationship in which the respective directions are perpendicular to each other, and may be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

Figure 2A:
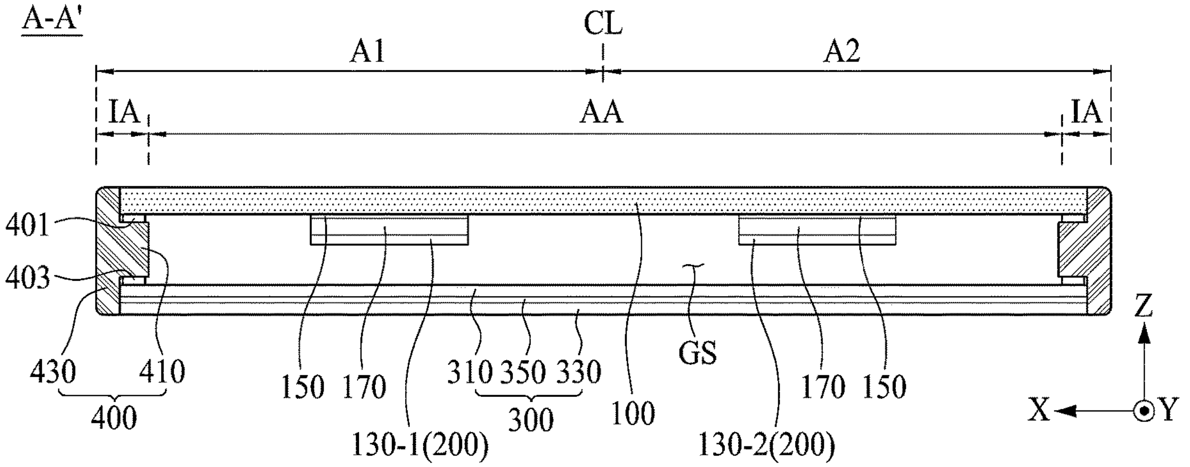
FIG. 2A is a cross-sectional view taken along line A-A' of FIG. 1.
Figure 2B:
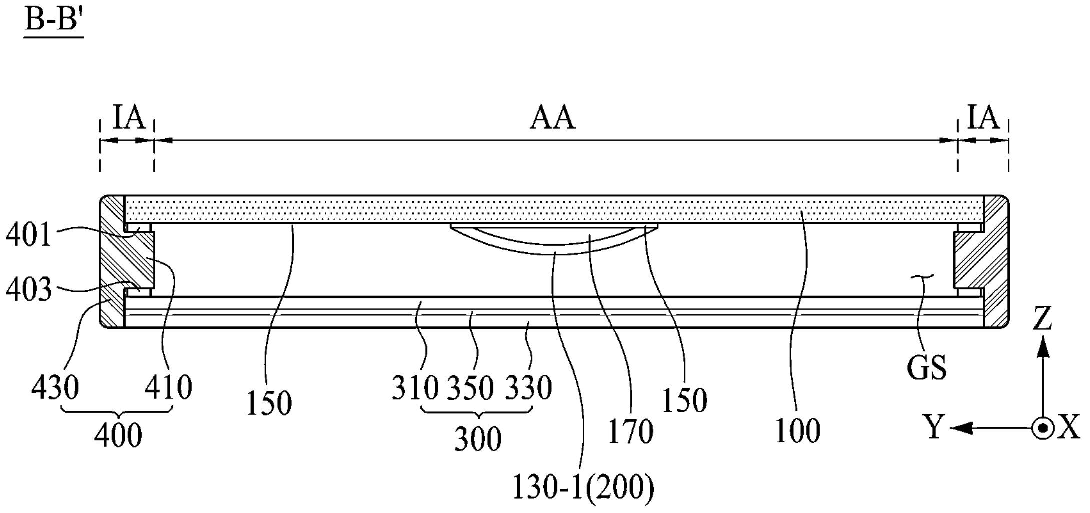
FIG. 2B is a cross-sectional view taken along line B-B' of FIG. 1.
Figure 3:
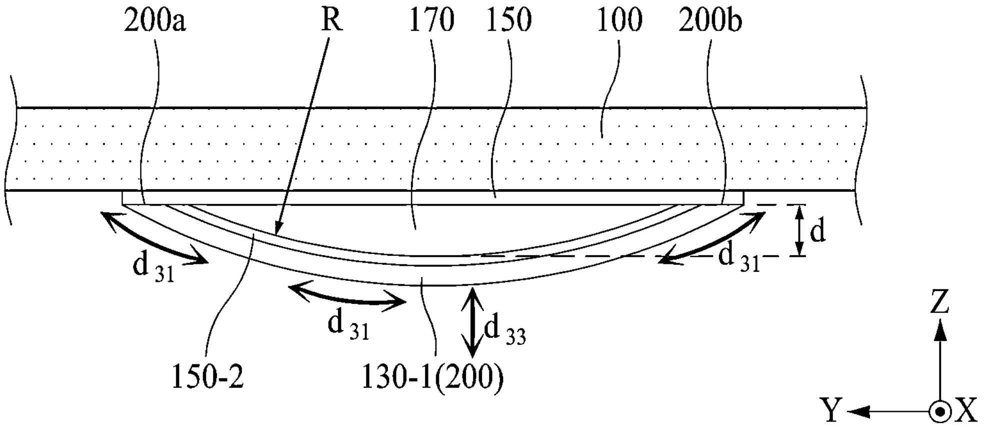
FIG. 3 is an enlarged view of a vibration member and a vibration apparatus of FIG. 2B.
Figure 4:
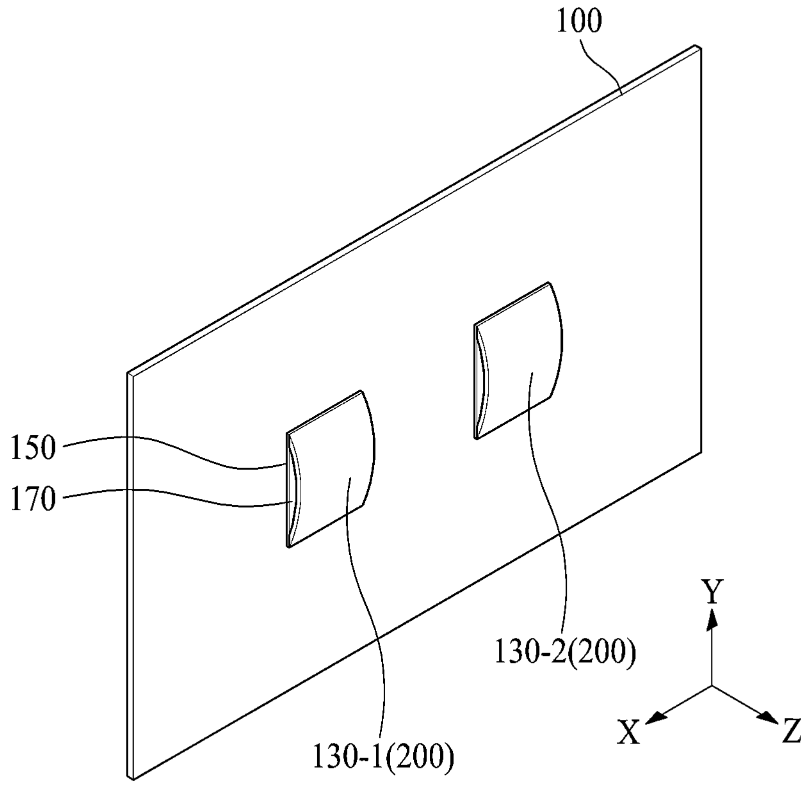
FIG. 4 is a perspective view of a vibration member and a vibration apparatus according to an embodiment of the present disclosure.

FIG. 1 illustrates an apparatus according to an embodiment of the present disclosure, FIG. 2A is a cross-sectional view taken along line A-A' of FIG. 1, and FIG. 2B is a cross-sectional view taken along line B-B' of FIG. 1, FIG. 3 is an enlarged view of a vibration member and a vibration apparatus of FIG. 2B, and FIG. 4 is a perspective view of a vibration member and a vibration apparatus according to an embodiment of the present disclosure.

Referring to FIGS. 1 and 2A, the apparatus 10 according to an embodiment of the present disclosure may include a vibration member 100 and a vibration apparatus 200 which is disposed at a rear surface (or a backside surface) of the vibration member 100.

For example, the vibration member 100 may output a sound based on a vibration of the vibration apparatus 200. The vibration apparatus 200 may output a sound by using the vibration member 100 as a vibration plate. For example, the vibration apparatus 200 may output a sound toward a front surface of the vibration member 100 by using the vibration member 100 as a vibration plate. For example, the vibration apparatus 200 may generate a sound so that the sound travels toward the front surface of the vibration member 100 or the display panel. The vibration apparatus 200 may vibrate the vibration member 100 to output a sound. For example, the vibration apparatus 200 may directly vibrate the vibration member 100 to output a sound. For example, the vibration member 100 may be a vibration object, a display panel, a vibration plate, or a front member, but embodiments of the present disclosure are not limited thereto. Hereinafter, an embodiment where a vibration member is a display panel will be described.

The vibration member 100 may display an image (for example, an electronic image, a digital image, a still image, or a video image). For example, the vibration member 100 may emit light to display an image. The display panel may be a curved display panel or all types of display panels such as a liquid crystal display panel, an organic light emitting display panel, a quantum dot light emitting display panel, a micro light emitting diode display panel, and an electrophoresis display panel. For example, the vibration member 100 may be a flexible light emitting display panel, a flexible electrophoresis display panel, a flexible electro-wetting display panel, a flexible micro light emitting diode display panel, or a flexible quantum dot light emitting display panel, but embodiments of the present disclosure are not limited thereto.

The vibration member 100 according to an embodiment of the present disclosure may include a display area AA which displays an image based on driving of a plurality of pixels. The vibration member 100 may include a non-display area IA which surrounds the display area AA, but embodiments of the present disclosure are not limited thereto.

The vibration member 100 according to an embodiment of the present disclosure may include an anode electrode, a cathode electrode, and a light emitting device and may display an image in a type such as a top emission type, a bottom emission type, or a dual emission type, based on a structure of a pixel array layer including a plurality of pixels. In the top emission type, visible light emitted from the pixel array layer may be irradiated a forward direction of a base substrate to allow an image to be displayed, and in the bottom emission type, the visible light emitted from the pixel array layer may be irradiated in a rearward direction of the base substrate to allow an image to be displayed.

The vibration member 100 according to an embodiment of the present disclosure may include a pixel array portion disposed on a substrate. The pixel array portion may include a plurality of pixels which display an image based on a signal supplied through each of signal lines. The signal lines may include a gate line, a data line, and a pixel driving power line, but embodiments of the present disclosure are not limited thereto.

Each of the plurality of pixels may include a pixel circuit layer including a driving TFT provided in a pixel area which is configured by a plurality of gate lines and/or a plurality of data lines, an anode electrode electrically connected to the driving TFT, a light emitting device formed on the anode electrode, and a cathode electrode electrically connected to the light emitting device.

The driving TFT may be provided in a transistor region of each pixel area provided in a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but embodiments of the present disclosure are not limited thereto.

The anode electrode (or a pixel electrode) may be provided in an opening region provided in each pixel area and may be electrically connected to the driving TFT.

The light emitting device according to an embodiment of the present disclosure may include an organic light emitting device layer provided on the anode electrode. The organic light emitting device layer may be implemented so that pixels emit light of the same color (for example, white light) or emit lights of different colors (for example, red light, green light, and blue light, or combination of other colors). The cathode electrode (or a common electrode) may be connected to the organic light emitting device layer provided in each pixel area. For example, the organic light emitting device layer may have a stack structure including two or more structures or a single structure including the same color.

In another embodiment of the present disclosure, the organic light emitting device layer may have a stack structure including two or more structures including one or more different colors for each pixel. Two or more structures including one or more different colors may be configured in one or more of blue, red, yellow-green, and green, or a combination thereof, but embodiments of the present disclosure are not limited thereto. An example of the combination may include blue and red, red and yellow-green, red and green, and red/yellow-green/green, but embodiments of the present disclosure are not limited thereto. Also, regardless of a stack order thereof, the combination may be applied. A stack structure including two or more structures having the same color or one or more different colors may further include a charge generating layer between two or more structures. The charge generating layer may have a PN junction structure and may include an N-type charge generating layer and a P-type charge generating layer.

According to another embodiment of the present disclosure, the light emitting device may include a micro light emitting diode device which is electrically connected to each of the anode electrode and the cathode electrode. The micro light emitting diode device may be a light emitting diode implemented as an integrated circuit (IC) type or a chip type. The micro light emitting diode device may include a first terminal electrically connected to the anode electrode and a second terminal electrically connected to the cathode electrode. The cathode electrode may be connected to the second terminal of the micro light emitting diode device provided in each pixel area.

An encapsulation portion may be formed on the substrate to surround the pixel array portion, and thus, may prevent oxygen or water from penetrating into the light emitting device layer of the pixel array portion. The encapsulation portion according to an embodiment of the present disclosure may be formed in a multi-layer structure where an organic material layer and an inorganic material layer are alternately stacked, but embodiments of the present disclosure are not limited thereto. For example, the encapsulation portion may also be formed by a single organic material layer or a single inorganic material layer. The inorganic material layer may prevent oxygen or water from penetrating into the light emitting device layer of the pixel array portion. The organic material layer may be formed to have a thickness which is relatively thicker than that of the inorganic material layer, so as to cover particles occurring in a manufacturing process. For example, the encapsulation portion may include a first inorganic layer, an organic layer on the first inorganic layer, and a second inorganic layer on the organic layer. The organic layer may be a particle covering layer, but the terms are not limited thereto. A touch panel may be disposed on the encapsulation portion, or may be disposed on a rear surface of the pixel array portion or in the pixel array portion.

The vibration member 100 according to an embodiment of the present disclosure may include a first substrate, a second substrate, and a liquid crystal layer. The first substrate may be an upper substrate or a TFT array substrate. For example, the first substrate may include a pixel array (or a display portion or a display area) including a plurality of pixels provided in a pixel area configured by the plurality of gate lines and/or the plurality of data lines. Each of the plurality of pixels may include a TFT connected to a gate line and/or a data line, a pixel electrode connected to the TFT, and a common electrode which is formed to be adjacent to the pixel electrode and is supplied with a common voltage.

The first substrate may further include a pad portion provided at a first edge (or a first non-display portion) thereof and a gate driving circuit provided at a second edge (or a second non-display portion) thereof.

The pad portion may supply the pixel array portion and/or the gate driving circuit with a signal supplied from the outside. For example, the pad portion may include a plurality of data pads connected to the plurality of data lines through a plurality of data link lines and/or a plurality of gate input pads connected to the gate driving circuit through a gate control signal line. For example, a size of the first substrate may be greater than that of the second substrate, but the terms are not limited thereto.

The gate driving circuit may be embedded (or integrated) into the second edge of the first substrate so as to be connected to the plurality of gate lines. For example, the gate driving circuit may be implemented with a shift register including a transistor formed by the same process as a TFT provided in the pixel area. According to another embodiment of the present disclosure, the gate driving circuit may not be embedded into the first substrate and may be provided in a panel driving circuit in an IC type.

The second substrate may be a lower substrate or a color filter array substrate. For example, the second substrate may include a pixel pattern (or a pixel definition pattern) capable of including an opening region overlapping the pixel arear formed in the first substrate and a color filter layer formed in the opening region. The second substrate may have a size which is less than that of the first substrate, but embodiments of the present disclosure are not limited thereto. The second substrate may overlap the other portion, except the first edge, of the first substrate. The second substrate may be bonded to the other portion, except the first edge, of the first substrate by a sealant with the liquid crystal layer therebetween.

The liquid crystal layer may be disposed between the first substrate and the second substrate. The liquid crystal layer may include liquid crystal where an alignment direction of liquid crystal molecules is changed based on an electrical field generated by the common voltage and a data voltage applied to the pixel electrode for each pixel.

A second polarization member may be attached on a bottom surface of the second substrate and may polarize light which is incident from a backlight and travels to the liquid crystal layer. The first polarization member may be attached on a top surface of the first substrate and may polarize light which passes through the first substrate and is discharged to the outside.

The vibration member 100 according to an embodiment of the present disclosure may drive the liquid crystal layer with the electrical field which is generated by the common voltage and the data voltage applied to each pixel, thereby displaying an image based on light passing through the liquid crystal layer.

In the vibration member 100 according to another embodiment of the present disclosure, the first substrate may be a color filter array substrate, and the second substrate may be a TFT array substrate. For example, the vibration member 100 according to another embodiment of the present disclosure may have a form where the vibration member 100 according to an embodiment of the present disclosure is vertically reversed. In this case, a pad portion of the vibration member 100 according to another embodiment of the present disclosure may be covered by a separate mechanism.

The vibration member 100 according to another embodiment of the present disclosure may include a bending portion which is bent or curved to have a certain curvature radius or a curved shape.

The bending portion of the vibration member 100 may be implemented at one or more of one edge portion and the other edge portion of the vibration member 100 parallel to each other. But embodiments are not limited there to. For example, the bending portion of the vibration member 100 may be implemented at at least one of all edge portions of the vibration member 100. The one edge portion and the other edge portion of the vibration member 100 implementing the bending portion may include only the non-display area IA, or may include an edge portion of the display area AA and the non-display area IA. The vibration member 100 including a bending portion implemented by bending of the non-display area IA may have a one-side bezel bending structure, a both-side bezel bending structure or even all-side bezel bending structure. Also, the vibration member 100 including the bending portion implemented by bending of the non-display area IA and the edge portion of the display area AA may have a one-side active bending structure, a both-side active bending structure or even all-side active bending structure.

The vibration apparatus 200 may vibrate the vibration member 100 at the rear surface of the vibration member 100, and thus, may provide a user with a sound and/or a haptic feedback based on a vibration of the vibration member 100. The vibration apparatus 200 may be implemented on a rear surface of the vibration member 100 to directly vibrate the vibration member 100. For example, the vibration apparatus 200 may be a vibration generating apparatus, a displacement apparatus, a sound apparatus, or a sound generating apparatus, but the terms are not limited thereto.

In an embodiment of the present disclosure, the vibration apparatus 200 may vibrate based on a vibration driving signal synchronized with an image displayed by the vibration member 100, thereby vibrating the vibration member 100. According to another embodiment of the present disclosure, the vibration apparatus 200 may vibrate based on a haptic feedback signal (or a tactile feedback signal) synchronized with a user touch applied to a touch panel (or a touch sensor layer) which is disposed at the vibration member 100 or embedded into the vibration member 100, and thus, may vibrate the vibration member 100. Accordingly, the vibration member 100 may vibrate based on a vibration of the vibration apparatus 200 to provide a user (or a viewer) with one or more of a sound and a haptic feedback. But embodiments are not limited there to. For example, the vibration driving signal may not be synchronized with the image displayed by the vibration member 100. Similarly, the haptic feedback signal (or a tactile feedback signal) may not be synchronized with the user touch applied to the touch panel.

The vibration apparatus 200 may vibrate the display panel or the vibration member 100. For example, the vibration apparatus 200 may be implemented on the rear surface of the vibration member 100 to directly vibrate the display panel or the vibration member 100. For example, the vibration apparatus 200 may vibrate the vibration member 100 at the rear surface of the display panel or the vibration member 100, and thus, may provide a user (or a viewer) with a sound and a haptic feedback based on a vibration of the display panel or the vibration member 100.

The vibration apparatus 200 according to an embodiment of the present disclosure may be implemented as a film type. Because the vibration apparatus 200 is implemented as a film type, the vibration apparatus 200 may have a thickness which is thinner than the vibration member 100, thereby minimizing an increase in thickness of the apparatus caused by the arrangement of the vibration apparatus 130. For example, the vibration apparatus 200 may be referred to as a sound generating module, a sound generating apparatus, a vibration generating apparatus, a displacement apparatus, a sound apparatus, a film actuator, a film type piezoelectric composite actuator, a film speaker, a film type piezoelectric speaker, or a film type piezoelectric composite speaker, which uses the display panel or the vibration member 100 as a vibration plate or a sound vibration plate, but the terms are not limited thereto.

The vibration apparatus 200 according to an embodiment of the present disclosure may include a ceramic-based material for generating a relatively high vibration, or may include a piezoelectric ceramic having a perovskite-based crystalline structure. The perovskite crystalline structure may have a piezoelectric effect and/or an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, the first portions may include one or more of lead(II) titanate ($PbTiO_3$), lead zirconate ($PbZrO_3$), lead zirconate titanate($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization, and a piezoelectric effect may be generated based on the variation of the polarization. In a perovskite crystalline structure including $PbTiO_3$, a position of a Ti ion corresponding to a center ion may be changed to vary polarization, and thus, a piezoelectric effect may be generated. For example, in the perovskite crystalline structure, a cubic shape having a symmetric structure may be changed to a tetragonal shape, an orthorhombic shape, and a rhombohedral shape each having an unsymmetric structure by using an external stress or a magnetic field, and thus, a piezoelectric effect may be generated. Polarization may be high at a morphotropic phase boundary (MPB) of a tetragonal structure and a rhombohedral structure, and polarization may be easily realigned, thereby obtaining a high piezoelectric characteristic.

According to an embodiment of the present disclosure, the vibration apparatus 200 may include one or more materials among lead (Pb), zirconium (Zr), titanium (Ti), zinc (Zn), nickel (Ni), and niobium (Nb), but embodiments of the present disclosure are not limited thereto.

The vibration apparatus 200 according to another embodiment of the present disclosure may include single crystalline ceramic and/or polycrystalline ceramic. The single crystalline ceramic may be a material where particles having a single crystal domain having a certain structure are regularly arranged. The polycrystalline ceramic may include irregular particles where various crystal domains are provided.

According to another embodiment of the present disclosure, the vibration apparatus 200 may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the presentdisclosure are not limited thereto. According to another embodiment of the present disclosure, the vibration apparatus 200 may include one or more of calcium titanate ($CaTiO_3$), $BaTiO_3$, and $SrTiO_3$, each including no Pb, but embodiments of the present disclosure are not limited thereto.

According to another embodiment of the present disclosure, the vibration apparatus 200 may have a piezoelectric deformation coefficient "$d_{33}$" of 1,000 pC/N or more in the thickness direction Z. By having a high piezoelectric deformation coefficient "$d_{33}$", it is possible to provide the vibrating apparatus that may be applied to a display panel or a vibration member (or a vibration object) having a large size or may have a sufficient vibration characteristic or piezoelectric characteristic. For example, in order to have a high piezoelectric deformation coefficient "$d_{33}$", the inorganic material portion may include a PZT-based material ($PbZrTiO_3$) as a main component and may include a softener dopant material doped into A site (Pb) and a relaxor ferroelectric material doped into B site (ZrTi).

The softener dopant material may enhance a piezoelectric characteristic and a dielectric characteristic of the vibration apparatus 200. For example, the softener dopant material may increase the piezoelectric deformation coefficient "$d_{33}$" of the inorganic material portion. The softener dopant material according to an embodiment of the present disclosure may include a dyad element "+2" to a triad element "+3". Morphotropic phase boundary (MPB) may be implemented by adding the softener dopant material to the PZT-based material ($PbZrTiO_3$), and thus, a piezoelectric characteristic and a dielectric characteristic may be enhanced. For example, the softener dopant material may include strontium (Sr), barium (Ba), lanthanum (La), neodymium (Nd), calcium (Ca), yttrium (Y), erbium (Er), or ytterbium (Yb). For example, ions (for example, $Sr^{2+}$, $Ba^{2+}$, $La^{2+}$, $Nd^{3+}$, $Ca^{2+}$, $Y^{3+}$, $Er^{3+}$, and $Yb^{3+}$) of the softener dopant material doped into the PZT-based material ($PbZrTiO_3$) may substitute a portion of lead (Pb) in the PZT-based material ($PbZrTiO_3$), and a substitution rate thereof may be about 2 mol % to about 20 mol %. For example, when the substitution rate is smaller than 2 mol % or greater than 20 mol %, a perovskite crystal structure may be broken, and thus, an electromechanical coupling coefficient "kP" and the piezoelectric deformation coefficient "$d_{33}$" may decrease. When the softener dopant material substitutes lead, the MPB may be formed, and a piezoelectric characteristic and a dielectric characteristic may be high in the MPB, thereby implementing a vibration apparatus having a high piezoelectric characteristic and a high dielectric characteristic.

According to an embodiment of the present disclosure, the relaxor ferroelectric material doped into the PZT-based material ($PbZrTiO_3$) may enhance an electric deformation characteristic of the inorganic material portion. The relaxor ferroelectric material according to an embodiment of the present disclosure may include a PMN-based material, a PNN-based material, a PZN-based material, or a PIN-based material, but embodiments of the present disclosure are not limited thereto. The PMN-based material may include Pb, Mg, and Nb, and for example, may include $Pb(Mg, Nb)O_3$. The PNN-based material may include Pb, Ni, and Nb, and for example, may include $Pb(Ni, Nb)O_3$. The PZN-based material may include Pb, Zr, and Nb, and for example, may include $Pb(Zn, Nb)O_3$. The PIN-based material may include Pb, In, and Nb, and for example, may include $Pb(In, Nb)O_3$. For example, the relaxor ferroelectric material doped into the PZT-based material ($PbZrTiO_3$) may substitute a portion of each of zirconium (Zr) and titanium (Ti) in the PZT-based material ($PbZrTiO_3$), and a substitution rate thereof may be about 5 mol % to about 25 mol %. For example, when the substitution rate is smaller than 5 mol % or greater than 25 mol %, a perovskite crystal structure may be broken, and thus, the electromechanical coupling coefficient "kP" and the piezoelectric deformation coefficient "$d_{33}$" may decrease.

According to an embodiment of the present disclosure, the vibration apparatus 200 may further include a donor material doped into B site (ZrTi) of the PZT-based material ($PbZrTiO_3$), in order to more enhance a piezoelectric coefficient. For example, the donor material doped into the B site (ZrTi) may include a tetrad element "+4" or a hexad element "+6". For example, the donor material doped into the B site (ZrTi) may include tellurium (Te), germanium (Ge), uranium (U), bismuth (Bi), niobium (Nb), tantalum (Ta), antimony (Sb), or tungsten (W).

The vibration apparatus 200 according to an embodiment of the present disclosure may have a piezoelectric deformation coefficient "$d_{33}$" of 1,000 pC/N or more in the thickness direction Z, and thus, a vibration apparatus having an enhanced vibration characteristic may be implemented. For example, a vibration apparatus having an enhanced vibration characteristic may be implemented in an apparatus or a vibration object having a large area.

According to another embodiment of the present disclosure, the vibration apparatus 200 may not be disposed at the rear surface of the vibration member 100 and may be applied to a non-display panel instead of the display panel. For example, the non-display panel may be one or more of wood, plastic, glass, metal, cloth, fiber, rubber, paper, leather, an interior material of a vehicle, an indoor ceiling of a building, and an interior material of an aircraft, but embodiments of the present disclosure are not limited thereto. In this case, the non-display panel may be applied as a vibration plate, and the vibration apparatus 200 may vibrate the non-display panel to output a sound.

For example, an apparatus according to an embodiment of the present disclosure may include a vibration member (or a vibration object) and the vibration apparatus 200 disposed in the vibration member. For example, the vibration member may include a display panel including a pixel displaying an image, or may include a non-display panel. For example, the vibration member may include a display panel including a pixel displaying an image, or may be one or more of wood, plastic, glass, metal, cloth, fiber, rubber, paper, leather, mirror, an interior material of a vehicle, a glass window of a vehicle, an indoor ceiling of a building, a glass window of a building, an interior material of a building, an interior material of an aircraft, and a glass window of an aircraft, but embodiments of the present disclosure are not limited thereto. For example, the vibration member may include one or more of a display panel including a pixel displaying an image, a screen panel on which an image is projected from a display apparatus, a lighting panel, a signage panel, a vehicular interior material, a vehicular glass window, a vehicular exterior material, a ceiling material of a building, an interior material of a building, a glass window of a building, an interior material of an aircraft, a glass window of an aircraft, and mirror, but embodiments of the present disclosure are not limited thereto. For example, the non-display panel may be a light emitting diode lighting panel (or apparatus), an organic light emitting diode lighting panel (or apparatus), or an inorganic light emitting diode lighting panel (or apparatus), but embodiments of the present disclosure are not limited thereto. For example, the vibration member may include a display panel including a pixel displaying an image, or may be one or more of a light emitting diode lighting panel (or apparatus), an organic light emitting diode lighting panel (or apparatus), or an inorganic light emitting diode lighting panel (or apparatus), but embodiments of the present disclosure are not limited thereto.

According to another embodiment of the present disclosure, the vibration member may include a plate. The plate may include a metal material, or may include a single nonmetal material or a complex nonmetal material including one or more of metal, wood, plastic, glass, cloth, fiber, rubber, paper, mirror, and leather, but embodiments of the present disclosure are not limited thereto. According to another embodiment of the present disclosure, the vibration member may include a plate. The plate may include one or more of metal, wood, plastic, glass, cloth, fiber, rubber, paper, mirror, and leather, but embodiments of the present disclosure are not limited thereto. For example, the paper may be a cone paper for speakers. For example, the cone paper may be pulp or foam plastic, but embodiments of the present disclosure are not limited thereto. For example, the vibration member may be a vibration object, a vibration plate, or a front member, but embodiments of the present disclosure are not limited thereto.

The vibration apparatus 200 according to an embodiment of the present disclosure may be disposed at the rear surface of the vibration member 100 to overlap the display area of the vibration member 100. For example, the vibration apparatus 200 may overlap a display area, corresponding to half or more, of the display area of the vibration member 100. According to another embodiment of the present disclosure, the vibration apparatus 200 may overlap the whole display area of the vibration member 100.

When an alternating current (AC) voltage is applied, the vibration apparatus 200 according to an embodiment of the present disclosure may alternately contract and expand based on an inverse piezoelectric effect and may vibrate the vibration member 100 based on a vibration. According to an embodiment of the present disclosure, the vibration apparatus 200 may vibrate based on a voice signal synchronized with an image displayed by the display panel to vibrate the vibration member 100. According to another embodiment of the present disclosure, the vibration apparatus 200 may vibrate based on a haptic feedback signal (or a tactile feedback signal) synchronized with a user touch applied to a touch panel (or a touch sensor layer) which is disposed on the vibration member 100 or embedded into the vibration member 100, and thus, may vibrate the vibration member 100. Accordingly, the vibration member 100 may vibrate based on a vibration of the vibration apparatus 200 to provide a user (or a viewer) with one or more of a sound and a haptic feedback.

Therefore, the apparatus according to an embodiment of the present disclosure may output a sound, generated by a vibration of the vibration member 100 based on a vibration of the vibration apparatus 200, in a forward direction of the vibration member 100. Also, the apparatus according to an embodiment of the present disclosure may vibrate a large region of the vibration member 100 by using the vibration apparatus 200 of a film type, thereby more enhancing a sense of sound localization and a sound pressure level characteristic of a sound based on a vibration of the vibration member 100.

According to an embodiment of the present disclosure, a rear surface (or a backside surface) of the vibration member 100 may include a first region (or a first rear region) A1 and a second region (or a second rear region) A2. For example, on the rear surface of the vibration member 100, the first region A1 may be a left rear region, and the second region A2 may be a right rear region. With a first direction X, the first region A1 and the second region A2 may be horizontally symmetrical with respect to a center line CL of the vibration member 100, but embodiments of the present disclosure are not limited thereto. For example, each of the first region A1 and the second region A2 may overlap the display area of the vibration member 100.

The vibration apparatus 200 according to an embodiment of the present disclosure may include a first vibration apparatus 130-1 and a second vibration apparatus 130-2, which are disposed at the rear surface of the vibration member 100.

The first vibration apparatus 130-1 may be disposed in the first region A1 of the vibration member 100. For example, the first vibration apparatus 130-1 may be disposed to be close to a center portion or an edge of the first region A1 of the vibration member 100, with respect to the first direction X. The first vibration apparatus 130-1 according to an embodiment of the present disclosure may vibrate the first region A1 of the vibration member 100, and thus, may generate a first vibration sound PVS1 or a first haptic feedback in the first region A1 of the vibration member 100. For example, the first vibration apparatus 130-1 according to an embodiment of the present disclosure may directly vibrate the first region A1 of the vibration member 100, and thus, may generate the first vibration sound PV or the first haptic feedback in the first region A1 of the vibration member 100. For example, the first vibration sound PVS1 may be a left sound. A size of the first vibration apparatus 130-1 according to an embodiment of the present disclosure may be half or less or half or more of a size of the first region A1 based on a characteristic of the first vibration sound PV or a sound characteristic desired by the apparatus. In another embodiment of the present disclosure, a size of the first vibration apparatus 130-1 may be a size corresponding to the first region A1 of the vibration member 100. For example, a size of the first vibration apparatus 130-1 may be a size which is less than or equal to that of the first region A1 of the vibration member 100.

The second vibration apparatus 130-2 may be disposed in the second region A2 of the vibration member 100. For example, the second vibration apparatus 130-2 may be disposed to be close to a center portion or an edge of the second region A2 of the vibration member 100, with respect to the first direction X. The second vibration apparatus 130-2 according to an embodiment of the present disclosure may vibrate the second region A2 of the vibration member 100, and thus, may generate a second vibration sound PVS2 or a second haptic feedback in the second region A2 of the vibration member 100. For example, the second vibration apparatus 130-2 according to an embodiment of the present disclosure may directly vibrate the second region A2 of the vibration member 100, and thus, may generate the second vibration sound PVS2 or the second haptic feedback in the second region A2 of the vibration member 100. For example, the second vibration sound PVS2 may be a right sound. A size of the second vibration apparatus 130-2 according to an embodiment of the present disclosure may be half or less or half or more of a size of the second region A2 based on a characteristic of the second vibration sound PVS2 or a sound characteristic desired by the apparatus. In another embodiment of the present disclosure, a size of the second vibration apparatus 130-2 may be a size corresponding to the second region A2 of the vibration member 100. For example, a size of the second vibration apparatus 130-2 may be a size which is less than or equal to that of the second region A2 of the vibration member 100. Accordingly, the first and second vibration apparatuses 130-1 and 130-2 may have the same size or different sizes, based on a left and right sound characteristic of the apparatus and/or a sound characteristic of the apparatus. Also, the first and second vibration apparatuses 130-1 and 130-2 may be disposed in a left and right symmetrical structure or a left and right asymmetrical structure with respect to the center line CL of the vibration member 100.

Each of the first and second vibration apparatuses 130-1 and 130-2 may include a piezoelectric structure material (a vibration portion or a piezoelectric vibration portion) including piezoelectric ceramic having a piezoelectric characteristic, but embodiments of the present disclosure are not limited thereto. For example, each of the first and second vibration apparatuses 130-1 and 130-2 according to an embodiment of the present disclosure may include piezoelectric ceramic having the perovskite crystalline structure, and thus, may be vibrated (or mechanically displaced) in response to an electrical signal applied from the outside. For example, when the vibration driving signal (or the voice signal) is applied, each of the first and second vibration apparatuses 130-1 and 130-2 may alternately and repeatedly contract and expand based on an inverse piezoelectric effect of the piezoelectric structure material (the vibration portion or the piezoelectric vibration portion), and thus, may be displaced (or vibrated) in the same direction based on a bending phenomenon where a bending direction is alternately changed, whereby a displacement amount (or a bending force) or an amplitude displacement of the vibration apparatus 200 or/and the vibration member 100 may increase or may be maximized.

A vibration generated by each of the first and second vibration apparatuses 130-1 and 130-2 may vibrate all of the first region (or the first rear region) A1 and the second region (or the second rear region) A2, thereby enhancing satisfaction of a user and increasing a sense of localization of a sound. Also, a contact area (or a panel coverage) between the vibration member 100 and each of the first and second vibration apparatuses 130-1 and 130-2 may increase, and thus, a vibration region of the vibration member 100 may increase, thereby enhancing a sound of a middle-low-pitched sound band generated based on a vibration of the vibration member 100. Also, the vibration apparatus 200 applied to a large-sized apparatus may vibrate all of the vibration member 100 having a large size (or a large area), and thus, a sense of localization of a sound based on a vibration of the vibration member 100 may be more enhanced, thereby realizing an enhanced sound effect. Accordingly, the vibration apparatus 200 according to an embodiment of the present disclosure may be disposed at the rear surface of the vibration member 100 to sufficiently vibrate the vibration member 100 in a vertical (or forward and rearward) direction, thereby outputting a desired sound in a forward direction of the vibration member 100 or the display apparatus or the apparatus. For example, the vibration apparatus 200 may be disposed at the rear surface of the vibration member 100 to sufficiently vibrate the vibration member 100 in a vertical (or forward and rearward) direction with respect to the first direction X, thereby outputting a desired sound in a forward direction of the vibration member 100 or the display apparatus or the apparatus.

The vibration apparatus 200 according to an embodiment of the present disclosure may further include a connection member 150. For example, the connection member 150 may be disposed between the vibration apparatus 200 and the vibration member 100. For example, the connection member 150 may be disposed between each of the first and second vibration apparatuses 130-1 and 130-2 and the vibration member 100.

The connection member 150 may be disposed between each of the first and second vibration apparatuses 130-1 and 130-2 and the vibration member 100. For example, the vibration apparatus 200 may be connected or coupled to the rear surface of the vibration member 100 by the connection member 150, and thus, may be supported by or disposed at the rear surface of the vibration member 100.

According to another embodiment of the present disclosure, the connection member 150 may further include a hollow portion provided between the vibration apparatus 200 and the vibration member 100. The hollow portion of the connection member 150 may provide an air gap between the vibration apparatus 200 and the vibration member 100. Based on the air gap, a sound wave (or a sound pressure level) based on a vibration of the vibration apparatus 200 may not be dispersed by the connection member 150 and may concentrate on the vibration member 100, and thus, the loss of a vibration based on the connection member 150 may be minimized, thereby increasing a sound pressure level characteristic and/or a sound characteristic of a sound generated based on a vibration of the vibration member 100.

The apparatus according to an embodiment of the present disclosure may further include a connection member 150 (or a first connection member) between the vibration apparatus 200 and the vibration member 100 or the display panel.

For example, the connection member 150 may be disposed between the vibration apparatus 200 and the rear surface of the vibration member 100 or the display panel, and thus, may connect or couple the vibration apparatus 200 to the rear surface of the vibration member 100. For example, the vibration apparatus 200 may be connected or coupled to the rear surface of the vibration member 100 or the display panel by using the connection member 150, and thus, may be supported by or disposed at the rear surface of the vibration member 100 or the display panel. For example, the vibration apparatus 200 may be disposed at the rear surface of the vibration member 100 or the display panel by the connection member 150.

The connection member 150 according to an embodiment of the present disclosure may include a material including an adhesive layer which is good in adhesive force or attaching force with respect to each of the rear surface of the vibration member 100 and the vibration apparatus 200. For example, the connection member 150 may include a foam pad, a double-sided tape, or an adhesive, but embodiments of the present disclosure are not limited thereto. For example, an adhesive layer of the connection member 150 may include epoxy, acryl, silicone, or urethane, but embodiments of the present disclosure are not limited thereto. For example, the adhesive layer of the connection member 150 may include an acryl-based material, having a characteristic where an adhesive force is relatively good and hardness is high, among acryl and urethane. Accordingly, a vibration of the vibration apparatus 200 may be well transferred to the vibration member 100.

The adhesive layer of the connection member 150 may further include an additive such as a tackifier, a wax component, or an anti-oxidation agent, but embodiments of the present disclosure are not limited thereto. The additive may prevent the connection member 150 from being detached (stripped) from the vibration member 100 by a vibration of the vibration apparatus 200. For example, the tackifier may be rosin derivative, the wax component may be paraffin wax, and the anti-oxidation agent may be a phenol-based anti-oxidation agent such as thioester, but embodiments of the present disclosure are not limited thereto.

According to another embodiment of the present disclosure, the connection member 150 may further include a hollow portion provided between the vibration apparatus 200 and the vibration member 100. The hollow portion of the connection member 150 may provide an air gap between the vibration apparatus 200 and the vibration member 100 or the display panel. Based on the air gap, a sound wave (or a sound pressure level) based on a vibration of the vibration apparatus 200 may not be dispersed by the connection member 150 and may concentrate on the vibration member 100 or the display panel, and thus, the loss of a vibration based on the connection member 150 may be minimized, thereby increasing a sound pressure level characteristic and/or a sound characteristic of a sound generated based on a vibration of the vibration member 100.

The apparatus 10 according to an embodiment of the present disclosure may further include a supporting member 300 which is disposed at the rear surface (or a backside surface) of the vibration member 100.

The supporting member 300 may be disposed at the rear surface of the vibration member 100 or the display panel. For example, the supporting member 300 may cover the whole rear surface of the vibration member 100 or the display panel. For example, the supporting member 300 may include one or more of a glass material, a metal material, and a plastic material. For example, the supporting member 300 may be a rear structure material, a set structure material, a supporting structure material, a supporting cover, a rear member, a case, or a housing, but the terms are not limited thereto. The supporting member 300 may be referred to as the other term such as a cover bottom, a plate bottom, a back cover, a base frame, a metal frame, a metal chassis, a chassis base, or an m-chassis. For example, the supporting member 300 may be implemented as an arbitrary type frame or a plate structure material disposed at the rear surface of the vibration member 100.

An edge or a sharp corner portion of the supporting member 300 may have an inclined shape or a curved shape through a chamfer process or a corner rounding process. For example, the glass material of the supporting member 300 may be sapphire glass. In another embodiment of the present disclosure, the supporting member 300 including the metal material may include one or more materials of aluminum (Al), an A1 alloy, a magnesium (Mg) alloy, and an iron (Fe)-nickel (Ni) alloy.

The apparatus according to an embodiment of the present disclosure may further include a middle frame 400. The middle frame 400 may be disposed between a rear edge of the display panel or the vibration member 100 and a front edge of the supporting member 300. The middle frame 400 may support one or more of an edge portion of the vibration member 100 and an edge portion of the supporting member 300. The middle frame 400 may surround one or more of lateral surfaces of each of the vibration member 100 and the supporting member 300. The middle frame 400 may provide the gap space GS between the display panel and the supporting member 300. The middle frame 400 may be referred to as a middle cabinet, a middle cover, a middle chassis, a connection member, a frame, a frame member, a middle member, or a lateral cover member, but the terms are not limited thereto.

The middle frame 400 according to an embodiment of the present disclosure may include a first supporting portion 410 and a second supporting portion 430. For example, the first supporting portion 410 may be a supporting portion, but the terms are not limited thereto. For example, the second supporting portion 430 may be a sidewall portion, but the terms are not limited thereto.

The first supporting portion 410 may be disposed between a rear edge of the vibration member 100 and a front edge of the supporting member 300, and thus, may provide a gap space GS between the vibration member 100 and the supporting member 300. A front surface of the first supporting portion 410 may be coupled or connected to the rear edge of the vibration member 100 by a first adhesive member 401. A rear surface of the first supporting portion 410 may be coupled or connected to the front edge of the supporting member 300 by a second adhesive member 403. For example, the first supporting portion 410 may have a single picture frame structure having a tetragonal shape or a picture frame structure having a plurality of division bar forms, but embodiments of the present disclosure are not limited thereto.

The second supporting portion 430 may be disposed in parallel with a thickness direction Z of the apparatus. For example, the second supporting portion 430 may be vertically coupled to an outer surface of the first supporting portion 410 in parallel with the thickness direction Z of the apparatus. The second supporting portion 430 may surround one or more of an outer surface of the vibration member 100 and an outer surface of the supporting member 300, thereby protecting the outer surface of each of the vibration member 100 and the supporting member 300. The first supporting portion 410 may protrude from an inner surface of the second supporting portion 430 to the gap space GS between the vibration member 100 and the supporting member 300.

The apparatus according to an embodiment of the present disclosure may include a panel connection member (or a connection member) instead of the middle frame 400.

The panel connection member may be disposed between the rear edge of the vibration member 100 and the front edge of the supporting member 300, and thus, may provide a gap space GS between the vibration member 100 and the supporting member 300. The panel connection member may be disposed between the rear edge of the vibration member 100 and the front edge of the supporting member 300 and may attach the vibration member 100 on the supporting member 300. For example, the panel connection member may be implemented with a double-sided tape, a single-sided tape, or a double-sided adhesive foam pad, but embodiments of the present disclosure are not limited thereto. For example, an adhesive layer of the panel connection member may include epoxy, acryl, silicone, or urethane, but embodiments of the present disclosure are not limited thereto. For example, in order to minimize the transfer of a vibration of the vibration member 100 to the supporting member 300, the adhesive layer of the panel connection member may include a urethane-based material, having a relatively ductile characteristic compared to acryl, among acryl and urethane. Accordingly, a vibration of the display panel 500 transferred to the supporting member 300 may be minimized.

According to another embodiment of the present disclosure, in the apparatus according to an embodiment of the present disclosure, the middle frame 400 may be omitted. Instead of the middle frame 400, a panel connection member or an adhesive may be provided. According to another embodiment of the present disclosure, instead of the middle frame 400, a partition may be provided.

Referring to FIGS. 2A, 2B, 3, and 4, the curved supporting member 170 may be disposed between the vibration member 100 and the vibration apparatus 200 and may include a first surface adjacent to the vibration apparatus 200 and a second surface opposite to the first surface, and the first surface may have a surface which differs from the second surface. For example, the first surface may be a curved surface, and the second surface may be a planar surface (or a flat surface). For example, the curved supporting member 170 may be a curved structure body, but the terms are not limited thereto.

The first surface of the curved supporting member 170 may have a certain curvature R, and a bent direction of a first surface of a curved-shape vibration apparatus 130-1 may be parallel to, for example, a second direction or a Y direction. Also, the bent direction of the first surface of the curved-shape vibration apparatus 130-1 may be parallel to, for example, a first direction or an X direction, or may be parallel to an undetermined direction.

According to an embodiment of the present disclosure, a curvature "R" value of the first surface of the curved supporting member 170 may be 300R to 4,000R. When the curvature "R" of the first surface of the curved supporting member 170 is less than 300R, damage may occur due to a rapid deformation of the below-described vibration portion 131*a*, and when the curvature "R" of the first surface of the curved supporting member 170 is greater than 4,000R, the degree of bending of a curved surface of the first surface of the curved supporting member 170 may be small and the degree to which a vibration component (for example, $d_{31}$ and $d_{33}$) of the vibration apparatus 200 contributes to a vibration may be low. Due to this, a sound pressure level characteristic of an apparatus may not be greatly improved.

According to an embodiment of the present disclosure, a maximum distance "d" between the first surface and the second surface of the curved supporting member 170 may be 0.45 mm to 6 mm.

Here, as illustrated in FIG. 3, the maximum distance "d" between the first surface and the second surface of the curved supporting member 170 may be a thickness of a center (or middle) of a first surface having a curved surface in the second direction (or the Y direction) and a center (or middle) of a second surface in the second direction (or the Y direction) in the apparatus according to the present disclosure, or may be a separation distance therebetween. For example, in a case where the first surface of the curved supporting member 170 is formed as a curved surface, the first surface of the curved supporting member 170 may have a maximum distance at the center (or middle) in the second direction (or the Y direction) and may have a distance which is progressively reduced from the maximum distance in a direction distancing from the center (or middle) in the second direction (or the Y direction). For example, a thickness of the first surface and the second surface or a separation distance may be 0 at both ends of the curved supporting member 170. For example, the first surface and the second surface of the curved supporting member 170 may be a structure where the first surface contacts the second surface at the both ends of the curved supporting member 170. Also, as described above, the maximum distance "d" between the first surface and the second surface of the curved supporting member 170 may be a center (or middle) in an undetermined direction instead of the center (or middle) in the second direction (or the Y direction).

When the maximum distance "d" between the first surface and the second surface of the curved supporting member 170 is more than 6 mm, damage may occur due to a rapid deformation of the below-described vibration portion 131*a*, and when the maximum distance "d" between the first surface and the second surface of the curved supporting member 170 is less than 0.45 mm, the degree of bending of a curved surface of the first surface of the curved supporting member 170 may be small and the degree to which the vibration component (for example, $d_{31}$ and $d_{33}$) of the vibration apparatus 200 contributes to a vibration may be low. Due to this, a sound pressure level characteristic of an apparatus may not be greatly improved. As illustrated in FIG. 2A, in the first surface of the curved supporting member 170, a cross-sectional surface taken along line A-A' parallel to the first direction (or the X direction) may have a certain height (or a constant height), and thus, may be illustrated in a tetragonal shape.

Therefore, the first surface of the supporting member 170 may be formed to have the certain curvature "R" in one direction, or may be formed to have a certain height in a different vertical direction in at least one direction.

The curved supporting member 170 may include one or more of wood, plastic, polymer, glass, metal, cloth, fiber, rubber, paper, and leather. When the curved supporting member 170 includes metal, the curved supporting member 170 may include one or more of aluminum, an aluminum alloy, magnesium, a magnesium alloy, and an iron-nickel (Fe—Ni) alloy. When the curved supporting member 170 includes plastic or polymer, the curved supporting member 170 may include a relatively hard material such as acrylonitrile-butadiene-styrene (ABS), polycarbonate (PC), or a compound of PC and ABS, or may include a relatively soft polymer such as synthetic rubber, natural rubber, silicone, or a different elastomer material.

According to an embodiment of the present disclosure, the vibration apparatus 200 disposed at a rear surface of the first surface of the curved supporting member 170 may have a shape corresponding to a curved surface of the first surface. Here, the vibration apparatus 200 may cause another stress and deformation based on a direction of an electrical field. Therefore, the vibration apparatus 200 may have directionality. In this case, $d_{33}$ may be a piezoelectric charge constant where deformation occurs in a specific direction (one direction) of the vibration apparatus 200 when an electrical field is applied in the one direction. For example, $d_{33}$ may be a piezoelectric charge constant (or a piezoelectric constant) where deformation occurs in a third direction (or a Z direction) of the vibration apparatus 200 when an electrical field is applied in the third direction (or the Z direction). Also, $d_{31}$ may be a piezoelectric charge constant where deformation occurs in a different direction when an electrical field is applied in one direction. For example, $d_{31}$ may be a piezoelectric charge constant (or a piezoelectric constant) where deformation occurs in a different direction (for example, a first direction or a second direction) when an electrical field is applied in the third direction (or the Z direction). In FIG. 3, a piezoelectric charge constant "$d_{33}$" and a piezoelectric charge constant "$d_{31}$" are illustrated in the vibration apparatus 200. In FIG. 3, the piezoelectric charge constant "$d_{33}$" may represent that a stress occurs in the third direction vertical to a plane of the vibration apparatus 130-1, and the piezoelectric charge constant "$d_{31}$" may represent that a stress occurs in the second direction parallel to the plane of the vibration apparatus 130-1. Hereinafter, therefore, the piezoelectric charge constant "$d_{33}$" may be a stress component vertical to the plane of the vibration apparatus 130-1, and the piezoelectric charge constant "$d_{31}$" may represent that a stress occurs in the second direction parallel to the plane of the vibration apparatus 130-1.

Therefore, in the following description, the piezoelectric charge constant "$d_{33}$" may be a stress component or a vibration component in a vertical direction of the vibration apparatus 200, and the piezoelectric charge constant "$d_{31}$" may be a stress component or a vibration component in a horizontal direction of the vibration apparatus 200.

Therefore, when the first surface and the second surface of the vibration apparatus 200 is formed to have a curved surface or a certain curvature as in FIG. 3, the vibration component "$d_{31}$" of the vibration apparatus 200 in the horizontal direction may not be offset and may be transferred to the vibration member 100 in a direction in which a first lateral surface and a second lateral surface of the vibration apparatus 200 faces the vibration member 100 or the connection member 150, and thus, a vibration characteristic of the apparatus and a sound pressure level generated by the apparatus may be enhanced. On the other hand, for example, the horizontal-direction vibration component "$d_{31}$" of the vibration apparatus 200 including no curved supporting member may be offset, and thus, a sound pressure level may not be enhanced compared to an embodiment of the present disclosure.

In the apparatus according to an embodiment of the present disclosure, one surface and the other surface of the vibration apparatus 130-1 may be adhered or connected to the vibration member 100 by using the connection member 150. One surface 200*a* and the other surface 200*b* of the vibration apparatus 130-1 may be attached on the vibration member 100 by using the connection member 150, and thus, a stress component and/or a vibration component "$d_{31}$" occurring in one surface and the other surface of the vibration apparatus 130-1 may contribute to enhance a sound pressure level.

Figure 5:
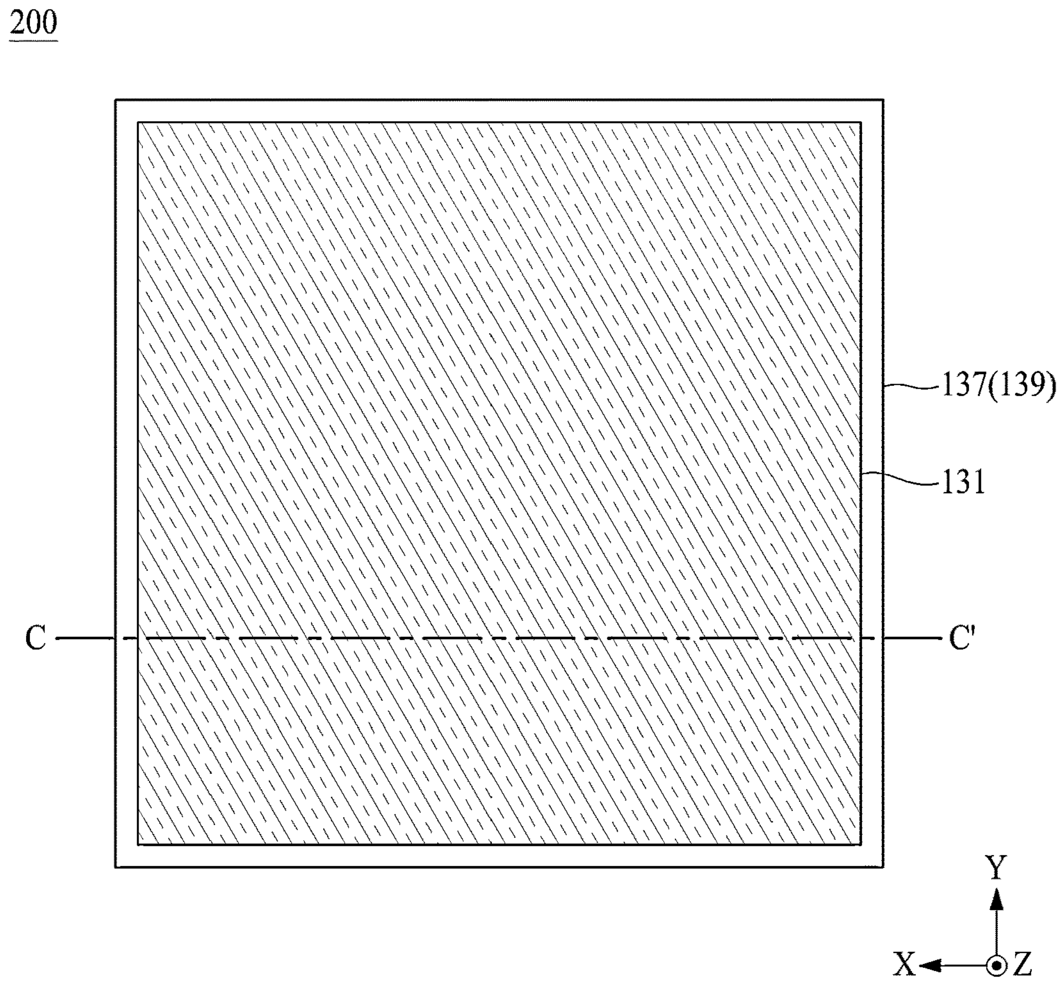
FIG. 5 is a plan view of a vibration apparatus according to an embodiment of the present disclosure.
Figure 6:
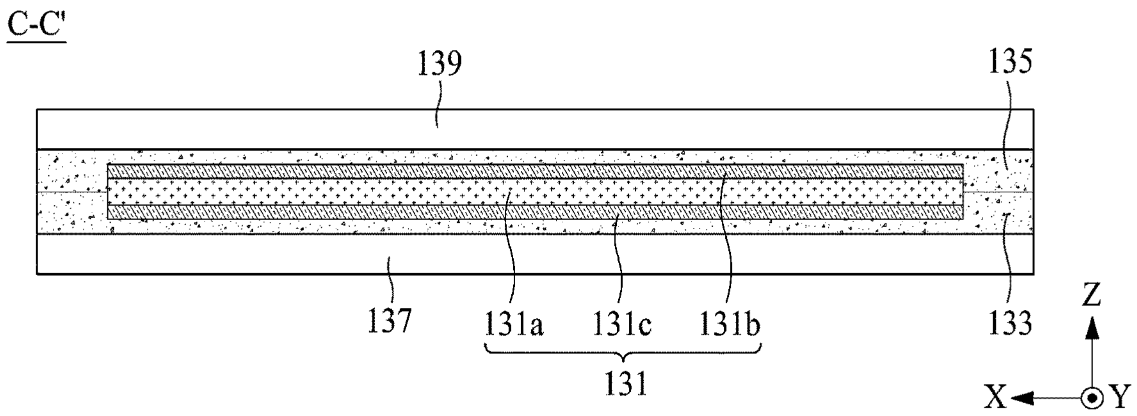
FIG. 6 is a cross-sectional view taken along line C-C' of FIG. 5.

FIG. 5 is a plan view of a vibration apparatus according to an embodiment of the present disclosure, and FIG. 6 is a cross-sectional view taken along line C-C' of FIG. 5.

Referring to FIGS. 5 to 6, a vibration device 131 according to an embodiment of the present disclosure may include a vibration portion 131*a*, a first electrode portion 131*b*, and a second electrode portion 131*c*.

The vibration device 131 according to an embodiment of the present disclosure may be referred to as a flexible vibration structure material, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

The vibration portion 131*a* may include a piezoelectric material. For example, the vibration portion 131*a* may include the piezoelectric material (or an electro active material) having a piezoelectric effect. For example, the piezoelectric material may have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. The vibration portion 131*a* may be referred to as the terms such as a vibration layer, a piezoelectric layer, a piezoelectric material layer, an electro active layer, a vibration portion, a piezoelectric material portion, an electro active portion, a piezoelectric structure material, a piezoelectric composite layer, a piezoelectric composite, or a piezoelectric ceramic composite, but the terms are not limited thereto. The vibration portion 131*a* may include a transparent conductive material, a semitransparent conductive material, or an opaque conductive material and may be transparent, semi-transparent, or opaque.

The vibration portion 131*a* according to an embodiment of the present disclosure may include a ceramic-based material for generating a relatively high vibration, or may include a piezoelectric ceramic having a perovskite-based crystalline structure. The perovskite crystalline structure may have a piezoelectric effect and/or an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, the first portions may include one or more of lead(II) titanate ($PbTiO_3$), lead zirconate ($PbZrO_3$), lead zirconate titanate($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization, and a piezoelectric effect may be generated based on the variation of the polarization. In a perovskite crystalline structure including $PbTiO_3$, a position of a Ti ion corresponding to a center ion may be changed to vary polarization, and thus, a piezoelectric effect may be generated. For example, in the perovskite crystalline structure, a cubic shape having a symmetric structure may be changed to a tetragonal shape, an orthorhombic shape, and a rhombohedral shape each having an unsymmetric structure by using an external stress or a magnetic field, and thus, a piezoelectric effect may be generated. Polarization may be high at a morphotropic phase boundary (MPB) of a tetragonal structure and a rhombohedral structure, and polarization may be easily realigned, thereby obtaining a high piezoelectric characteristic.

According to an embodiment of the present disclosure, the vibration portion 131*a* may include one or more materials among lead (Pb), zirconium (Zr), titanium (Ti), zinc (Zn), nickel (Ni), and niobium (Nb), but embodiments of the present disclosure are not limited thereto.

The vibration portion 131*a* according to another embodiment of the present disclosure may include single crystalline ceramic and/or polycrystalline ceramic. The single crystalline ceramic may be a material where particles having a single crystal domain having a certain structure are regularly arranged. The polycrystalline ceramic may include irregular particles where various crystal domains are provided.

According to another embodiment of the present disclosure, the vibration portion 131*a* may include a lead zirconate titanate (PZT)-based material including lead (Pb), zirconium (Zr), and titanium (Ti) or may include a lead zirconate nickel niobate (PZNN)-based material including lead (Pb), zinc (Zn), nickel (Ni), and niobium (Nb), but embodiments of the present disclosure are not limited thereto. According to another embodiment of the present disclosure, the vibration portion 131*a* may include a lead magnesium niobate (PMN)-based material, a lead nikel niobate (PNN)-based material, a lead zirconate niobate (PZN)-based material, or a lead indium niobate (PIN)-based material, but embodiments of the present disclosure are not limited thereto. The PMN-based material may include Pb, magnesium (Mg), and Nb, and for example, may be $Pb(Mg, Nb)O_3$. The PNN-based material may include Pb, Ni, and Nb, and for example, may include $Pb(Ni, Nb)O_3$. The PIN-based material may include Pb, In, and Nb, and for example, may include $Pb(In, Nb)O_3$. According to another embodiment of the present disclosure, the vibration portion 131*a* may include one or more of calcium titanate ($CaTiO_3$), $BaTiO_3$, and $SrTiO_3$, each including no Pb, but embodiments of the present disclosure are not limited thereto.

According to another embodiment of the present disclosure, the vibration portion 131*a* may have a piezoelectric deformation coefficient "$d_{33}$" of 1,000 pC/N or more in the thickness direction Z. By having a high piezoelectric deformation coefficient "$d_{33}$", it is possible to provide the vibrating apparatus that may be applied to a display panel or a vibration member (or a vibration object) having a large size or may have a sufficient vibration characteristic or piezoelectric characteristic. For example, in order to have a high piezoelectric deformation coefficient "$d_{33}$", the inorganic material portion may include a PZT-based material ($PbZrTiO_3$) as a main component and may include a softener dopant material doped into A site (Pb) and a relaxor ferroelectric material doped into B site (ZrTi).

The softener dopant material may enhance a piezoelectric characteristic and a dielectric characteristic of the vibration portion 131*a*. For example, the softener dopant material may increase the piezoelectric deformation coefficient "$d_{33}$" of the inorganic material portion. The softener dopant material according to an embodiment of the present disclosure may include a dyad element "+2" to a triad element "+3". Morphotropic phase boundary (MPB) may be implemented by adding the softener dopant material to the PZT-based material ($PbZrTiO_3$), and thus, a piezoelectric characteristic and a dielectric characteristic may be enhanced. For example, the softener dopant material may include strontium (Sr), barium (Ba), lanthanum (La), neodymium (Nd), calcium (Ca), yttrium (Y), erbium (Er), or ytterbium (Yb). For example, ions (for example, Sr', $Ba^{2+}$, $La^{2+}$, $Nd^{3+}$, $Ca^{2+}$, $Y^{3+}$, $Er^{3+}$, and $Yb^{3+}$) of the softener dopant material doped into the PZT-based material ($PbZrTiO_3$) may substitute a portion of lead (Pb) in the PZT-based material ($PbZrTiO_3$), and a substitution rate thereof may be about 2 mol % to about 20 mol %. For example, when the substitution rate is smaller than 2 mol % or greater than 20 mol %, a perovskite crystal structure may be broken, and thus, an electromechanical coupling coefficient "kP" and the piezoelectric deformation coefficient "$d_{33}$" may decrease. When the softener dopant material substitutes lead, the MPB may be formed, and a piezoelectric characteristic and a dielectric characteristic may be high in the MPB, thereby implementing a vibration apparatus having a high piezoelectric characteristic and a high dielectric characteristic.

According to an embodiment of the present disclosure, the relaxor ferroelectric material doped into the PZT-based material ($PbZrTiO_3$) may enhance an electric deformation characteristic of the inorganic material portion. The relaxor ferroelectric material according to an embodiment of the present disclosure may include a PMN-based material, a PNN-based material, a PZN-based material, or a PIN-based material, but embodiments of the present disclosure are not limited thereto. The PMN-based material may include Pb, Mg, and Nb, and for example, may include $Pb(Mg, Nb)O_3$. The PNN-based material may include Pb, Ni, and Nb, and for example, may include $Pb(Ni, Nb)O_3$. The PZN-based material may include Pb, Zr, and Nb, and for example, may include $Pb(Zn, Nb)O_3$. The PIN-based material may include Pb, In, and Nb, and for example, may include $Pb(In, Nb)O_3$. For example, the relaxor ferroelectric material doped into the PZT-based material ($PbZrTiO_3$) may substitute a portion of each of zirconium (Zr) and titanium (Ti) in the PZT-based material ($PbZrTiO_3$), and a substitution rate thereof may be about 5 mol % to about 25 mol %. For example, when the substitution rate is smaller than 5 mol % or greater than 25 mol %, a perovskite crystal structure may be broken, and thus, the electromechanical coupling coefficient "kP" and the piezoelectric deformation coefficient "$d_{33}$" may decrease.

According to an embodiment of the present disclosure, the vibration portion 131_a_ may further include a donor material doped into B site (ZrTi) of the PZT-based material ($PbZrTiO_3$), in order to more enhance a piezoelectric coefficient. For example, the donor material doped into the B site (ZrTi) may include a tetrad element "+4" or a hexad element "+6". For example, the donor material doped into the B site (ZrTi) may include tellurium (Te), germanium (Ge), uranium (U), bismuth (Bi), niobium (Nb), tantalum (Ta), antimony (Sb), or tungsten (W).

The vibration portion 131_a_ according to an embodiment of the present disclosure may have a piezoelectric deformation coefficient "$d_{33}$" of 1,000 pC/N or more in the thickness direction Z, and thus, a vibration apparatus having an enhanced vibration characteristic may be implemented. For example, a vibration apparatus having an enhanced vibration characteristic may be implemented in an apparatus or a vibration object having a large area.

The first electrode portion 131_b_ may be disposed at a first surface (or an upper surface) of the vibration portion 131_a_ and may be electrically connected to a first surface of the vibration portion 131_a_. The second electrode portion 131_c_ may be disposed at a second surface (or a lower surface) of the vibration portion 131_a_ and may be electrically connected to a second surface of the vibration portion 131_a_. For example, the vibration portion 131_a_ may be polarized (or poling) by a certain voltage applied to the first electrode portion 131_b_ and the second electrode portion 131_c_ in a certain temperature atmosphere or a temperature atmosphere which is changed from a high temperature to a room temperature, but embodiments of the present disclosure are not limited thereto.

For example, the first electrode portion 131_b_ may have a common electrode form which is disposed at a whole first surface of the vibration portion 131_a_. The first electrode portion 131_b_ according to an embodiment of the present disclosure may include a transparent conductive material, a semitransparent conductive material, or an opaque conductive material. For example, the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), or magnesium (Mg), or an alloy thereof, but embodiments of the present disclosure are not limited thereto.

The second electrode portion 131_c_ may be disposed at a second surface (or a rear surface or a backside surface), which is opposite to the first surface, of the vibration portion 131_a_ and may be electrically connected to the second surface of the vibration portion 131_a_. For example, the second electrode portion 131_c_ may have a common electrode form which is disposed at the whole second surface of the vibration portion 131_a_. The second electrode portion 131_c_ according to an embodiment of the present disclosure may include a transparent conductive material, a semitransparent conductive material, or an opaque conductive material. For example, the second electrode portion 131_c_ may include the same material as that of the first electrode portion 131_b_, but embodiments of the present disclosure are not limited thereto. In another embodiment of the present disclosure, the second electrode portion 131_c_ may include a material which differs from that of the first electrode portion 131_b_.

According to another embodiment of the present disclosure, the vibration device 131 (or the vibration apparatus 200) may further include a first cover member 139 and a second cover member 137.

The first cover member 139 may be disposed at a first surface of the vibration device 131. For example, the first cover member 139 may be disposed at the first electrode portion 131_b_. For example, the first cover member 139 may be on the first electrode portion 131_b_. For example, the first cover member 139 may cover the first electrode portion 131_b_ disposed at the first surface of the vibration portion 131_a_, and thus, may protect the first surface of the vibration portion 131_a_ or the first electrode portion 131_b_.

The second cover member 137 may be disposed at a second surface of the vibration device 131. For example, the second cover member 137 may be disposed at the second electrode portion 131_c_. For example, the second cover member 137 may be on the second electrode portion 131_c_. For example, the second cover member 137 may cover the second electrode portion 131_c_ disposed at the second surface of the vibration portion 131_a_, and thus, may protect the second surface of the vibration portion 131_a_ or the second electrode portion 131_c_.

Each of the first cover member 139 and the second cover member 137 according to an embodiment of the present disclosure may include one or more materials of plastic, fiber, and wood, but embodiments of the present disclosure are not limited thereto. For example, the first cover member 139 and the second cover member 137 may include the same material or different materials. For example, the first cover member 139 and the second cover member 137 may be a polyimide film or a polyethylene terephthalate film, but embodiments of the present disclosure are not limited thereto.

According to another embodiment of the present disclosure, the vibration device 131 (or the vibration apparatus 200) may further include a first adhesive layer 135 and a second adhesive layer 133. For example, the first adhesive layer 135 may be disposed between the first cover member 139 and the first electrode portion 131*b*. For example, the second adhesive layer 135 may be disposed between the second cover member 137 and the second electrode portion 131*c*.

The first cover member 139 according to an embodiment of the present disclosure may be disposed at the first surface of the vibration portion 131*a* by using the first adhesive layer 135. For example, the first cover member 139 may be connected or coupled to the first electrode portion 131*b* by using the first adhesive layer 135. For example, the first cover member 139 may be disposed at the first surface of the vibration portion 131*a* by a film laminating process by the first adhesive layer 135. Accordingly, the vibration portion 131*a* may be provided (or disposed) as one body with the first cover member 139.

The second cover member 137 according to an embodiment of the present disclosure may be disposed at the second surface of the vibration portion 131*a* by using the second adhesive layer 133. For example, the second cover member 137 may be connected or coupled to the second electrode portion 131*c* by using the second adhesive layer 133. For example, the second cover member 137 may be disposed at the second surface of the vibration portion 131*a* by a film laminating process using the second adhesive layer 133. Accordingly, the vibration portion 131*a* may be provided (or disposed) as one body with the second cover member 137.

For example, the first and second adhesive layers 135 and 133 may fully surround the vibration device 131. For example, the first and second adhesive layers 135 and 133 may be disposed between the first cover member 139 and the second cover member 137 to surround the vibration portion 131*a*, the first electrode portion 131*b*, and the second electrode portion 131*c*. For example, the first and second adhesive layers 135 and 133 may be disposed between the first cover member 139 and the second cover member 137 to fully surround the vibration portion 131*a*, the first electrode portion 131*b*, and the second electrode portion 131*c*. For example, the vibration portion 131*a*, the first electrode portion 131*b*, and the second electrode portion 131*c* may be buried or embedded between the first adhesive layer 135 and the second adhesive layer 133. For convenience of description, the first adhesive layer 135 and the second adhesive layer 133 are illustrated as the first adhesive layer 135 and the second adhesive layer 133, but are not limited thereto and may be provided as one adhesive layer.

Each of the first adhesive layer 135 and the second adhesive layer 133 according to an embodiment of the present disclosure may include an electrical insulation material which has adhesive properties and is capable of compression and decompression. For example, each of the first adhesive layer 135 and the second adhesive layer 133 may include epoxy resin, acrylic resin, silicone resin, and urethane resin, but embodiments of the present disclosure are not limited thereto.

The vibration apparatus 200 according to an embodiment of the present disclosure may further include a signal cable.

The signal cable may be electrically connected to a pad portion disposed in the vibration apparatus 200 and may supply the vibration apparatus 200 with a vibration driving signal (or a sound signal) provided from a sound processing circuit. The signal cable according to an embodiment of the present disclosure may include a terminal, and the terminal may be electrically connected to a pad electrode of the pad portion. For example, the signal cable may be configured as a flexible cable, a flexible printed circuit cable, a flexible flat cable, a single-sided flexible printed circuit, a single-sided flexible printed circuit board, a flexible multilayer printed circuit, or a flexible multi-layer printed circuit board (PCB), but embodiments of the present disclosure are not limited thereto. For example, the signal cable may be configured to be transparent, semitransparent, or opaque.

The sound processing circuit may generate an alternating current (AC) vibration driving signal including a first vibration driving signal and a second vibration driving signal based on a sound source. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode portion 131*b* of the vibration device 131 through the terminal of the signal cable, the pad electrode of the pad portion, and a first power supply line. The second vibration driving signal may be supplied to the second electrode portion 131*c* of the vibration device 131 through the terminal of the signal cable, the pad electrode of the pad portion, and a second power supply line.

According to an embodiment of the present disclosure, the vibration portion 131*a* may be configured as one body by the first and second cover members 139 and 137, thereby providing a vibration apparatus having a simplified structure and a thin thickness.

Figure 7A:
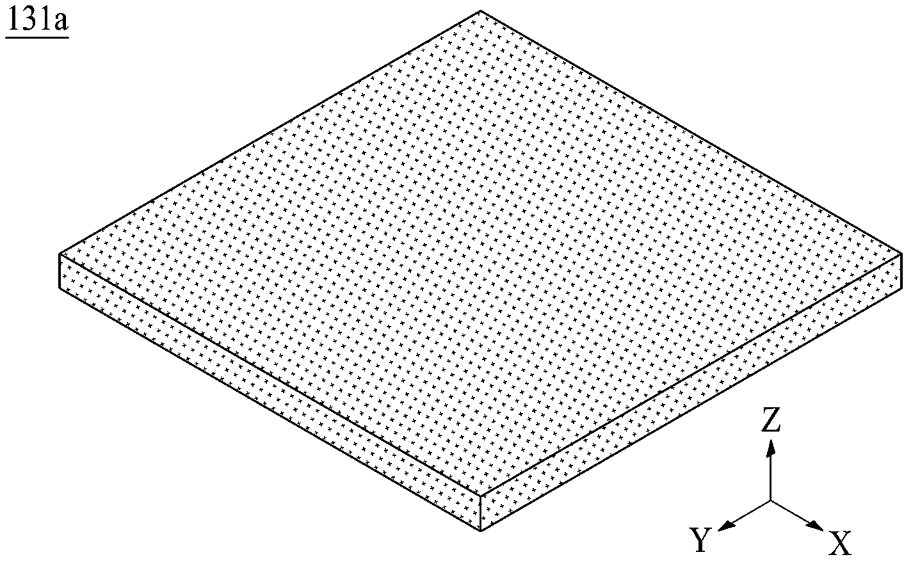
FIGS. 7A and 7B illustrate a structure of a vibration portion of a vibration apparatus according to an embodiment of the present disclosure.
Figure 7B:
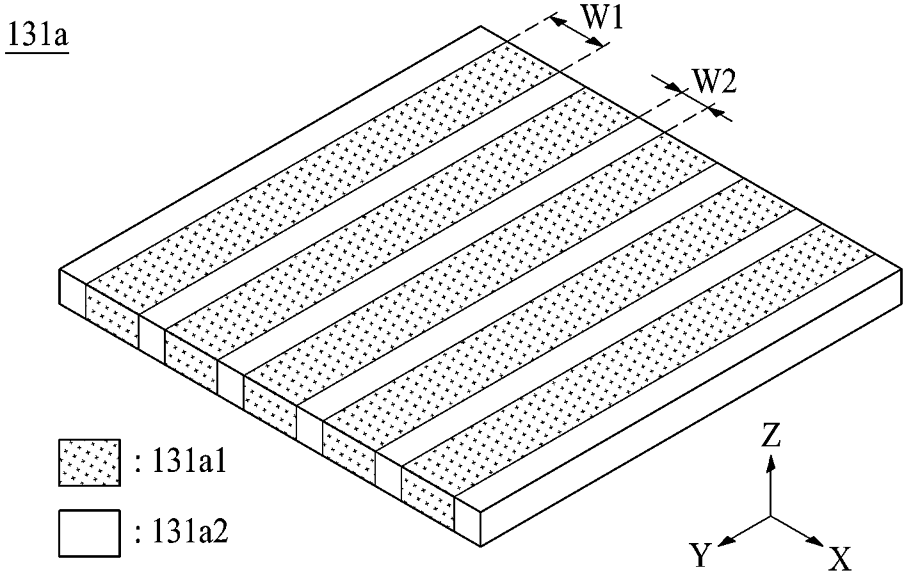

FIGS. 7A and 7B illustrate a structure of a vibration portion of a vibration apparatus according to an embodiment of the present disclosure.

Referring to FIG. 7A, a vibration portion 131*a* may be provided in a solid structure having no pattern. Also, the vibration portion 131*a* may include a ceramic-based perovskite material described below and may have flexibility capable of being bent to correspond to a first surface, having a curve, of the curved supporting member 170 described above.

The vibration portion 131*a* may include a ceramic-based material for generating a relatively high vibration, or may include a piezoelectric ceramic having a perovskite-based crystalline structure. The perovskite crystalline structure may have a piezoelectric effect and/or an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "O" may be anions. For example, the vibration portion 131*a* may include one or more of lead(II) titanate ($PbTiO_3$), lead zirconate ($PbZrO_3$), lead zirconate titanate($PbZrTiO_3$), barium titanate ($BaTiO_3$), and strontium titanate ($SrTiO_3$), but embodiments of the present disclosure are not limited thereto.

In a perovskite crystalline structure, a position of a center ion may be changed by an external stress or a magnetic field to vary polarization, and a piezoelectric effect may be generated based on the variation of the polarization. In a perovskite crystalline structure including $PbTiO_3$, a position of a Ti ion corresponding to a center ion may be changed to vary polarization, and thus, a piezoelectric effect may be generated. For example, in the perovskite crystalline structure, a cubic shape having a symmetric structure may be changed to a tetragonal shape, an orthorhombic shape, and a rhombohedral shape each having an unsymmetric structure by using an external stress or a magnetic field, and thus, a piezoelectric effect may be generated. Polarization may be high at a morphotropic phase boundary (MPB) of a tetragonal structure and a rhombohedral structure, and polarization may be easily realigned, thereby obtaining a high piezoelectric characteristic.

the vibration portion 131*a* may include a lead zirconate titanate (PZT)-based material including lead (Pb), zirconium (Zr), and titanium (Ti) or may include a lead zirconate nickel niobate (PZNN)-based material including lead (Pb), zinc (Zn), nickel (Ni), and niobium (Nb), but embodiments of the present disclosure are not limited thereto. According to another embodiment of the present disclosure, the vibration portion 131*a* may include a lead magnesium niobate (PMN)-based material, a lead nikel niobate (PNN)-based material, a lead zirconate niobate (PZN)-based material, or a lead indium niobate (PIN)-based material, but embodiments of the present disclosure are not limited thereto. The PMN-based material may include Pb, magnesium (Mg), and Nb, and for example, may be $Pb(Mg, Nb)O_3$. The PNN-based material may include Pb, Ni, and Nb, and for example, may include $Pb(Ni, Nb)O_3$. The PIN-based material may include Pb, In, and Nb, and for example, may include $Pb(In, Nb)O_3$. According to another embodiment of the present disclosure, the vibration portion 131*a* may include one or more of calcium titanate ($CaTiO_3$), $BaTiO_3$, and $SrTiO_3$, each including no Pb, but embodiments of the present disclosure are not limited thereto.

Referring to FIG. 7B, the vibration device according to an embodiment of the present disclosure may be referred to as a flexible vibration structure material, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

Referring to FIG. 7B, the vibration portion 131*a* according to an embodiment of the present disclosure may include a plurality of first portions 131*a*1 and a plurality of second portions 131*a*2. For example, the plurality of first portions 131*a*1 and the plurality of second portions 131*a*2 may be alternately and repeatedly arranged in a first direction X (or a second direction Y). For example, the first direction X may be a widthwise direction of the vibration portion 131*a* and the second direction Y may be a lengthwise direction of the vibration portion 131*a* intersecting with the first direction X, but embodiments of the present disclosure are not limited thereto and the first direction X may be a lengthwise direction of the vibration portion 131*a* and the second direction Y may be a widthwise direction of the vibration portion 131*a*.

According to an embodiment of the present disclosure, the vibration portion 131*a* may be formed in a continuous structure in a second direction or a Y direction. Referring to FIGS. 7A and 7B in conjunction with FIG. 3, when the vibration portion 131*a* is formed in a discontinuous structure in the second direction or the Y direction, the stress component "$d_{33}$" may not be transferred to the vibration member 100. Therefore, a desired structure of the vibration portion 131*a* according to an embodiment of the present disclosure may be formed in a continuous structure in the Y direction. For example, a desired structure of the vibration portion 131*a* according to an embodiment of the present disclosure may be formed in a continuous structure in the Y direction while in a discontinuous structure in a direction other than the Y direction.

For example, the first portion 131*a*1 may include an inorganic material, and the second portion 131*a*2 may include an organic material. For example, the first portion 131*a*1 may have a piezoelectric material, and the second portion 131*a*2 may have a ductile characteristic or flexibility. For example, the inorganic material of the first portion 131*a*1 may have a piezoelectric material, and the organic material of the second portion 131*a*2 may have a ductile characteristic or flexibility.

Each of the plurality of first portions 131*a*1 may include an inorganic material portion. The inorganic material portion may include a piezoelectric material, a composite piezoelectric material, or an electro active material, which has a piezoelectric effect.

Each of the plurality of first portions 131*a*1 may include the same material as that of the vibration portion 131*a* described above with reference to FIG. 7A.

Each of a plurality of second portions 131*a*2 according to an embodiment of the present disclosure may include an organic material portion. The organic material portion included in the second portion 131*a*2 may include an organic material, an organic polymer, an organic piezoelectric material, or an organic non-piezoelectric material having a flexible characteristic compared to the inorganic material portion which is the first portion 131*a*1. For example, the second portion 131*a*2 may be referred to as an adhesive portion, a stretch portion, a bending portion, a damping portion, or a flexible portion having flexibility, but embodiments of the present disclosure are not limited thereto. For example, the organic material portion may be disposed between two adjacent inorganic material portions, and thus, may absorb an impact applied to the inorganic material portion (or a first portion) and may release a stress which concentrates on the inorganic material portion, thereby enhancing the durability of the vibration portion 131*a* or the vibration device 131 and providing flexibility to the vibration portion 131*a* or the vibration device 131.

Each of the plurality of second portions 131*a*2 may be disposed between the plurality of first portions 131*a*1. Therefore, in the vibration portion 131*a* or the vibration device 131, vibration energy based on a link in a unit lattice of the first portion 131*a*1 may be increased by the second portion 131*a*2, and thus, a vibration characteristic may increase and a piezoelectric characteristic and flexibility may be secured. For example, the second portion 131*a*2 may include one of an epoxy-based polymer, an acrylic-based polymer, and a silicone-based polymer, but embodiments of the present disclosure are not limited thereto.

The second portion 131*a*2 according to an embodiment of the present disclosure may have a modulus and viscoelasticity that are lower than those of the first portion 131*a*1, and thus, the second portion 131*a*2 may enhance the reliability of the first portion 131*a*1 vulnerable to an impact due to a fragile characteristic of the first portion 131*a*1. For example, the second portion 131*a*2 may include a material having a loss coefficient of about 0.01 to about 1 and a modulus of about 0.1 GPa to about 10 GPa(GigaPascals).

In the vibration portion 131*a*, the plurality of first portions 131*a*1 and the plurality of second portions 131*a*2 may be disposed (or arranged) in parallel on the same plane (or the same layer). Each of the plurality of second portions 131*a*2 may be configured to fill a gap between two adjacent first portions 131*a*1, and thus, each of the plurality of second portions 131*a*2 may be connected to or attached on an adjacent first portion 131*a*. Accordingly, the vibration portion 131*a* may extend by a desired size or length based on lateral coupling (or connection) of the first portion 131*a*1 and the second portion 131*a*2.

Referring to FIG. 7B, a plurality of first portions 131*a*1 and a plurality of second portions 131*a*2 may be alternately and repeatedly arranged in a first direction X. Each of the plurality of first portions 131*a*1 may be disposed between the plurality of second portions 131*a*2. For example, each of the plurality of first portions 131*a*1 may have a first width W1 parallel to the first direction X and a length parallel to the second direction Y. Each of the plurality of second portions 131*a*2 may have a second width W2 parallel to the first direction X and a length parallel to the second direction Y. The first width W1 may be the same as or different from the second width W2. For example, the first width W1 may be greater than the second width W2. For example, the first portion 131*a*1 and the second portion 131*a*2 may include a line shape or a stripe shape having the same size or different sizes. Accordingly, the vibration portion 131*a* illustrated in FIG. 7B may have a 2-2 composite structure and may have a resonance frequency of 20 kHz or less, but embodiments of the present disclosure are not limited thereto. For example, a resonance frequency of the vibration portion 131*a* may vary based on one or more of a shape, a length, and a thickness of the vibration portion.

In the vibration portion 131*a* illustrated in FIG. 7B, the plurality of first portions 131*a*1 and the plurality of second portions 131*a*2 may be disposed (or arranged) in parallel on the same plane (or the same layer). Each of the plurality of second portions 131*a*2 may be configured to fill a gap between two adjacent first portions 131*a*1, and thus, each of the plurality of second portions 131*a*2 may be connected to or attached on an adjacent first portion 131*a*. Accordingly, the vibration portion 131*a* may extend by a desired size or length based on lateral coupling (or connection) of the first portion 131*a*1 and the second portion 131*a*2.

In the vibration portion 131*a* illustrated in FIG. 7B, the width W2 of each of the plurality of second portions 131*a*2 may decrease progressively in a direction from a center portion of the vibration portion 131*a* or the vibration apparatus to both edge portions (or both sides or both ends) thereof.

According to an embodiment of the present disclosure, a second portion 131*a*2, having a largest width W2 among the plurality of second portions 131*a*2, may be located at a portion at which a highest stress may concentrate when the vibration portion 131*a* or the vibration apparatus is vibrating in a vertical direction Z (or a thickness direction). A second portion 131*a*2, having a smallest width W2 among the plurality of second portions 131*a*2, may be located at a portion where a relatively low stress may occur when the vibration portion 131*a* or the vibration apparatus is vibrating in the vertical direction Z. For example, the second portion 131*a*2, having the largest width W2 among the plurality of second portions 131*a*2, may be disposed at the center portion of the vibration portion 131*a*, and the second portion 131*a*2, having the smallest width W2 among the plurality of second portions 131*a*2 may be disposed at each of the both peripheries of the vibration portion 131*a*. Therefore, when the vibration portion 131*a* or the vibration apparatus is vibrating in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure level and a lowest sound pressure level.

In the vibration portion 131*a* illustrated in FIG. 7B, the plurality of first portions 131*a*1 may have different sizes (or widths). For example, a size (or a width) of each of the plurality of first portions 131*a*1 may decrease or increase progressively in a direction from the center portion of the vibration portion 131*a* or the vibration apparatus to both edge portions (or both sides or both ends) thereof. Therefore, a sound pressure level characteristic of a sound of the vibration portion 131*a* may be enhanced by various unique vibration frequencies based on vibrations of the plurality of first portions 131*a*1 having different sizes, and a reproduction band of a sound may extend.

Each of the plurality of second portions 131*a*2 may be disposed between the plurality of first portions 131*a*1. Therefore, in the vibration portion 131*a* or the vibration device 131, vibration energy based on a link in a unit lattice of the first portion 131*a*1 may be increased by the second portion 131*a*2, and thus, a vibration characteristic may increase and a piezoelectric characteristic and flexibility may be secured. For example, the second portion 131*a*2 may include one of an epoxy-based polymer, an acrylic-based polymer, and a silicone-based polymer, but embodiments of the present disclosure are not limited thereto.

Each of the plurality of second portions 131*a*2 according to an embodiment of the present disclosure may be configured with an organic material portion. For example, the organic material portion may be disposed between two adjacent inorganic material portions, and thus, may absorb an impact applied to the inorganic material portion (or the first portion) and may release a stress concentrating on the inorganic material portion, thereby enhancing the durability of the vibration portion 131*a* or the vibration device 131 and realizing the flexibility of the vibration portion 131*a* or the vibration device 131.

The second portion 131*a*2 according to an embodiment of the present disclosure may have a modulus and viscoelasticity that are lower than those of the first portion 131*a*1, and thus, the second portion 131*a*2 may enhance the reliability of the first portion 131*a*1 vulnerable to an impact due to a fragile characteristic of the first portion 131*a*1. For example, the second portion 131*a*2 may include a material having a loss coefficient of about 0.01 to about 1 and a modulus of about 0.1 GPa to about 10 GPa(GigaPascals).

The organic material portion included in the second portion 131*a*2 may include an organic material, an organic polymer, an organic piezoelectric material, or an organic non-piezoelectric material having a flexible characteristic compared to the inorganic material portion which is the first portion 131*a*1. For example, the second portion 131*a*2 may be referred to as an adhesive portion, a flexible portion, a bending portion, a damping portion, or a ductile portion, or the like, but embodiments of the present disclosure are not limited thereto.

The plurality of first portions 131*a*1 and the plurality of second portions 131*a*2 may be disposed on (or connected to) the same plane, and thus, the vibration portion 131*a accordinging to the present embodiment may have a single thin film form. For example, the vibration portion 131_a_ may have a structure where the plurality of first portions 131_a_1 are connected to one side thereof. For example, the vibration portion 131_a_ may have a structure where the plurality of first portions 131_a_1 are connected in entirety of the vibration portion 131_a_. For example, the vibration portion 131_a_ may be vibrated in a vertical direction with respect to the display panel or the vibration member by the first portion 131_a_1 having a vibration characteristic and may be bent in a curved shape by the second portion 131_a_2 having flexibility. Also, in the vibration portion 131_a_ according to the present embodiment, a size of the first portion 131_a_1 and a size of the second portion 131_a_2 may be adjusted based on a piezoelectric characteristic and flexibility needed for the vibration portion 131_a_ or the vibration device 131. For example, in the vibration portion 131_a_ requiring a piezoelectric characteristic rather than flexibility, a size of the first portion 131_a_1 may be adjusted to be greater than that of the second portion 131_a_2. In another embodiment of the present disclosure, in the vibration portion 131_a_ requiring flexibility rather than a piezoelectric characteristic, a size of the second portion 131_a_2 may be set to be greater than that of the first portion 131_a_1. Accordingly, a size of the vibration portion 131_a_ may be adjusted based on a desired characteristic, and thus, the vibration portion 131**_a_ may be easily designed.

Figure 8A:
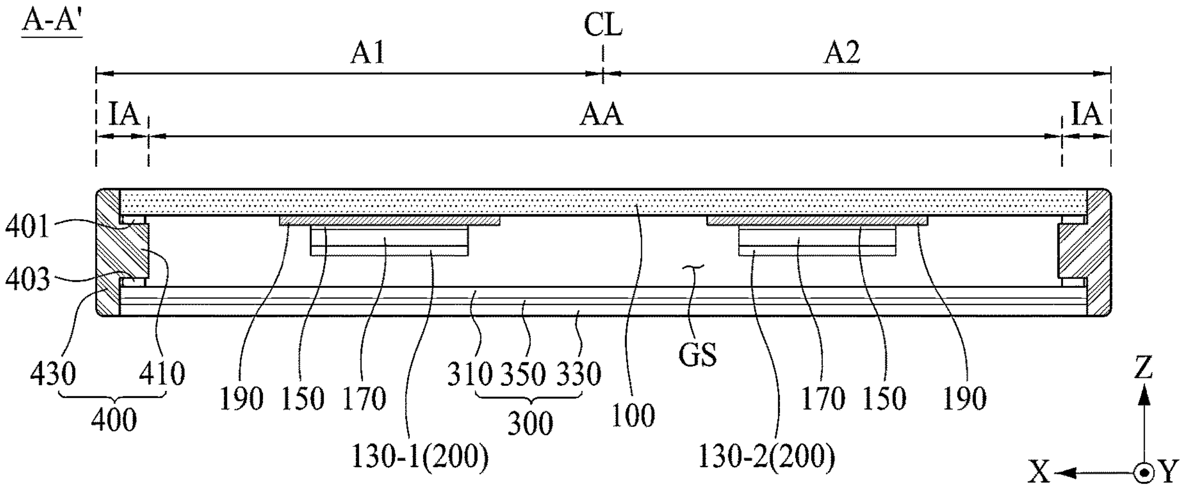
FIG. 8A is another cross-sectional view taken along line A-A' of FIG. 1.
Figure 8B:
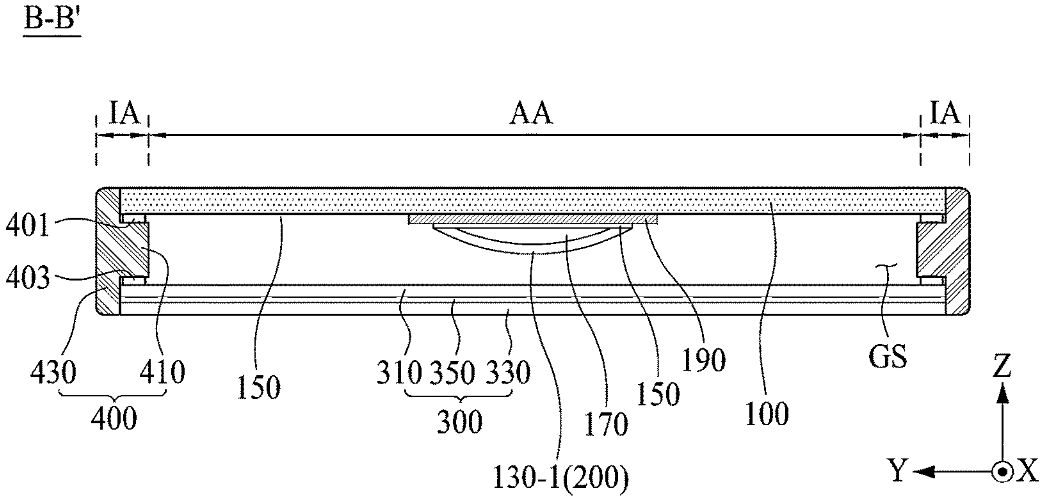
FIG. 8B is another cross-sectional view taken along line B-B' of FIG. 1.
Figure 9:
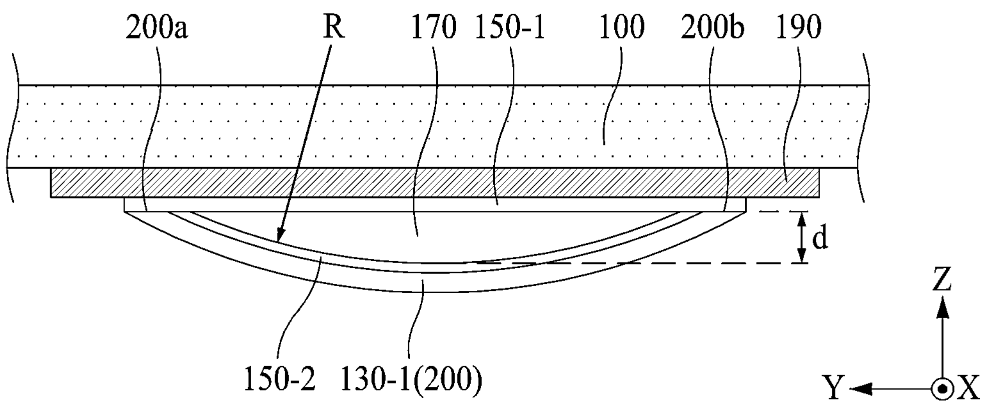
FIG. 9 is an enlarged view of a vibration member and a vibration apparatus of FIG. 8B.
Figure 10:
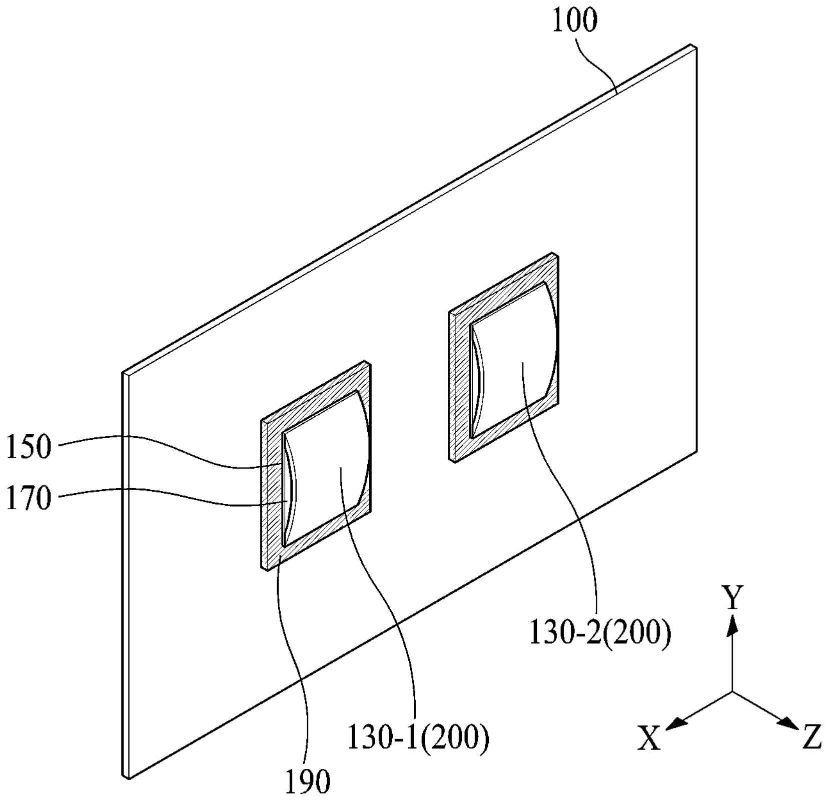
FIG. 10 is another perspective view of a vibration member and a vibration apparatus according to an embodiment of the present disclosure.

FIG. 8A is another cross-sectional view taken along line A-A' of FIG. 1, and FIG. 8B is another cross-sectional view taken along line B-B' of FIG. 1, FIG. 9 is an enlarged view of a vibration member and a vibration apparatus of FIG. 8B, and FIG. 10 is another perspective view of a vibration member and a vibration apparatus according to an embodiment of the present disclosure.

Referring to FIGS. 8 to 10, the apparatus according to an embodiment of the present disclosure may further include a secondary vibration member 190 disposed between a vibration member 100 and a vibration apparatus 200.

The secondary vibration member 190 may be disposed between each of the first vibration apparatus 130-1 and the second vibration apparatus 130-2 of the vibration apparatus 200 and the rear surface of the vibration member 100.

The secondary vibration member 190 may dissipate heat generated from the vibration member 100 or may reinforce a mass of each of the first vibration apparatus 130-1 and the second vibration apparatus 130-2 which is disposed at or hung from the rear surface of the vibration member 100. The secondary vibration member 190 may have the same shape and size as the rear surface of the vibration member 100, or may have the same shape and size as the vibration apparatus 200. As another embodiment of the present disclosure, the secondary vibration member 190 may have a size different from the vibration member 100. For example, the secondary vibration member 190 may be smaller than the size of the vibration member 100. As another embodiment of the present disclosure, the secondary vibration member 190 may have a size different from the vibration apparatus 200. For example, the secondary vibration member 190 may be greater or smaller than the size of the vibration apparatus 200. The vibration apparatus 200 may be the same as or smaller than the size of the vibration member 100.

The secondary vibration member 190 according to an embodiment of the present disclosure may include a metal material. For example, the secondary vibration member 190 may include one or more materials of stainless steel, aluminum (Al), a magnesium (Mg), a Mg alloy, a magnesium-lithium (Mg—Li) alloy, and an A1 alloy, but embodiments of the present disclosure are not limited thereto.

The secondary vibration member 190 according to an embodiment of the present disclosure may include a plurality of opening portions. The plurality of opening portions may be configured to have a predetermined size and a predetermined interval. For example, the plurality of opening portions may be provided along a first direction X and a second direction Y so as to have a predetermined size and a predetermined interval. Due to the plurality of opening portions, a sound wave (or a sound pressure) based on a vibration of the vibration apparatus 200 may not be dispersed by the secondary vibration member 190, and may concentrate on the vibration member 100. Thus, the loss of a vibration caused by the secondary vibration member 190 may be minimized, thereby increasing a sound pressure level characteristic of a sound generated based on a vibration of the vibration member 100. For example, the secondary vibration member 190 including the plurality of openings may have a mesh shape. For example, the secondary vibration member 190 including the plurality of openings may be a mesh plate.

According to some embodiments of the present disclosure, the secondary vibration member 190 may be connected or coupled to the rear surface of the vibration member 100. The secondary vibration member 190 may dissipate heat occurring in the vibration member 100. For example, the secondary vibration member 190 may be referred to as a heat dissipation member, a heat dissipation plate, or a heat sink, but embodiments of the present disclosure are not limited thereto.

According to an embodiment of the present disclosure, the secondary vibration member 190 may reinforce a mass of the vibration apparatus 200 which is disposed at or hung from the rear surface of the vibration member 100. Thus, the secondary vibration member 190 may decrease a resonance frequency of the vibration apparatus 200 based on an increase in mass of the vibration apparatus 200. Therefore, the secondary vibration member 190 may increase a sound characteristic and a sound pressure level characteristic of the low-pitched sound band generated based on a vibration of the vibration apparatus 200 and may enhance the flatness of a sound pressure level characteristic. For example, the flatness of a sound pressure level characteristic may be a magnitude of a deviation between a highest sound pressure level and a lowest sound pressure level. For example, the secondary vibration member 190 may be referred to as a weight member, a mass member, a sound planarization member, or the like, but embodiments of the present disclosure are not limited thereto.

According to an embodiment of the present disclosure, a displacement amount (or a bending force or a flexural force) or an amplitude displacement (or a vibration width) of the vibration member 100 with the secondary vibration member 190 disposed therein may decrease as a thickness of the secondary vibration member 190 increases, based on the stiffness of the secondary vibration member 190. Accordingly, a sound pressure level characteristic and a low-pitched sound band characteristic of a sound may be generated based on a displacement (or a vibration) of the vibration member 100.

Figure 11A:
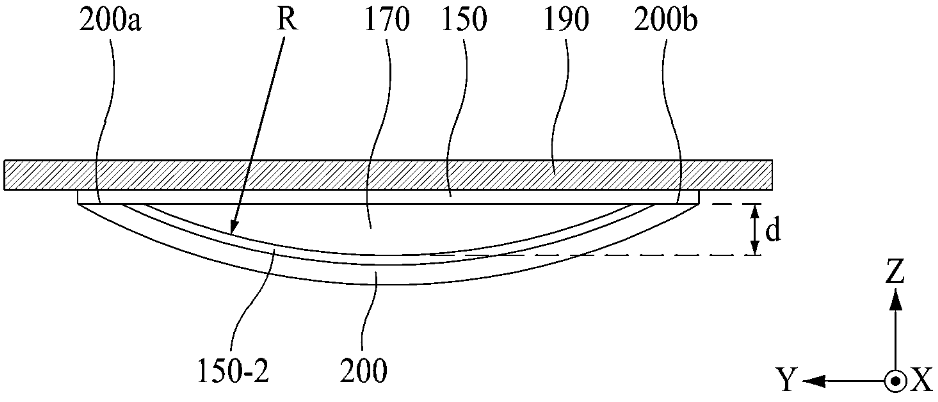
FIG. 11A illustrates an example where a vibration apparatus is coupled to a secondary vibration member according to an embodiment of the present disclosure.
Figure 11B:
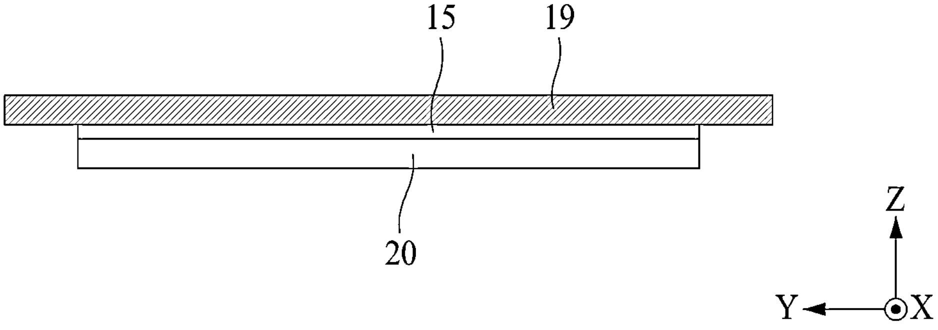
FIG. 11B illustrates an example where a vibration apparatus and a secondary vibration member according to an experiment example are coupled to each other.

FIG. 11A illustrates an example where a vibration apparatus is coupled to a secondary vibration member according to an embodiment of the present disclosure, and FIG. 11B illustrates an example where a vibration apparatus and a secondary vibration member according to an experiment example are coupled to each other.

Referring to FIG. 11A, the apparatus according to an embodiment of the present disclosure may include a secondary vibration member 190, a vibration apparatus 200, and a curved supporting member 170 between the secondary vibration member 190 and the vibration apparatus 200, and moreover, may include a first connection member 150 between a curved supporting member 170 and the secondary vibration member 190 and a second connection member 150-2 between the curved supporting member 170 and the vibration apparatus 200. Here, a first surface, which is adjacent to the vibration apparatus 200, of the curved supporting member 170 may be prepared to include a curved surface having a certain curvature "R" in a second direction or a Y direction, and thus, the vibration apparatus 200 disposed at the first surface of the curved supporting member 170 may be disposed at the first surface of the curved supporting member 170 in a state where the vibration apparatus 200 is bent to have bending or flexing corresponding to the first surface of the supporting member 170.

In FIG. 11A, the curved supporting member 170 has been prepared to include acrylonitrile-butadiene-styrene (ABS), and the secondary vibration member 190 has been prepared to include polyethylene terephthalate (PET). In this case, a thickness of the secondary vibration member 190 has been prepared to 0.2 mm, and a width and a length thereof have been prepared to 170×280 mm. However, in the specification, a dimension of the secondary vibration member 190 is not limited thereto.

Referring to FIG. 11B, an apparatus of an experiment example of the present disclosure may be configured to include a secondary vibration member 19, a vibration apparatus 20, and a connection member 15 between the secondary vibration member 19 and the vibration apparatus 20. In FIG. 11, the secondary vibration member 19 has been prepared to include polyethylene terephthalate (PET). A thickness of the secondary vibration member 19 has been prepared to 0.2 mm, and a width and a length thereof have been prepared to 170×280 mm.

Figure 12:
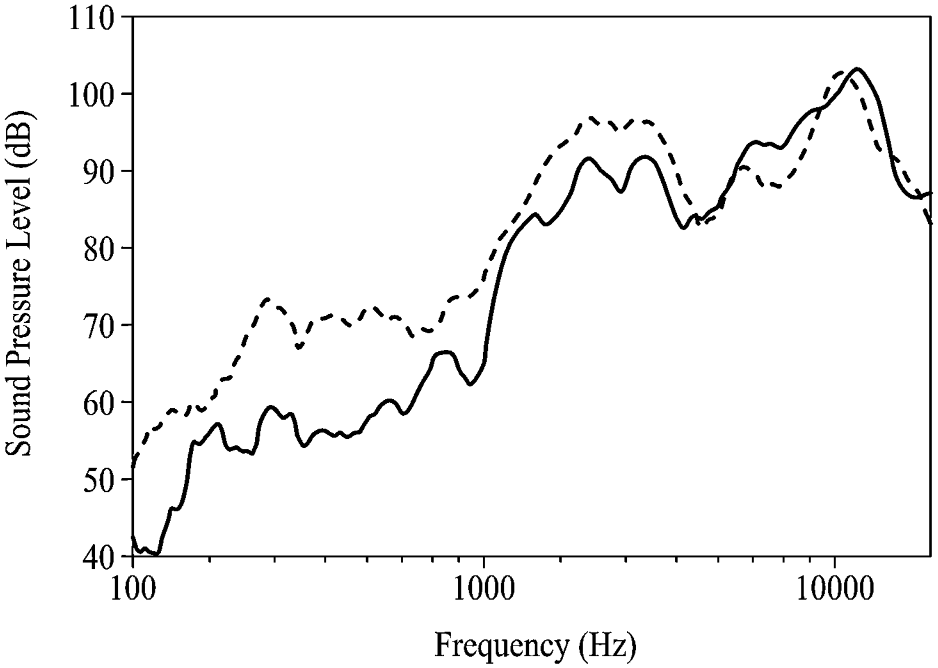
FIG. 12 illustrates a sound pressure level with respect to a frequency, in an apparatus of FIGS. 11A and 11B.

FIG. 12 illustrates a sound pressure level with respect to a frequency, in an apparatus of FIGS. 11A and 11B.

A sound output characteristic may be measured by a sound analysis apparatus. The sound analysis apparatus may be B&K audio measurement equipment. The sound analysis apparatus may include a sound card which transmits or receives a sound to or from a control personal computer (PC), an amplifier which amplifies a signal generated from the sound card and transfers the amplified signal to a vibration apparatus, and a microphone which collects a sound generated by the vibration apparatus in a display panel. For example, the microphone may be disposed at a center of the vibration apparatus, and a distance between the display panel and the microphone may be about 50 cm. A sound may be measured in a state where the microphone is vertical to the vibration apparatus. The sound collected by the microphone may be input to the control PC through the sound card, and the sound of the vibration apparatus may be analyzed through checking in a control program. For example, a frequency response characteristic of a frequency range of 100 Hz to 20 kHz may be measured by using a pulse program.

In FIG. 12, the abscissa axis represents a frequency (Hz (hertz)), and the ordinate axis represents a sound pressure level (SPL) (dB (decibel)). A dotted line of FIG. 12 represents a sound output characteristic of an apparatus of FIG. 11A, and a solid line represents a sound output characteristic of FIG. 11B.

Referring to FIG. 12, comparing with the solid line, in the dotted line, it may be seen that a sound output characteristic is enhanced in 200 Hz to 4,000 Hz. For example, comparing with the solid line, in the dotted line, it may be seen that a sound pressure level is enhanced in a middle-low-pitched sound band. For example, comparing with the solid line, in the dotted line, it may be seen that a sound pressure level is averagely enhanced by about 10 dB in 100 Hz to 1,000 Hz and is enhanced by about 14 dB in a maximum of 400 Hz. For example, it may be seen that a sound pressure level is averagely enhanced by about 4 dB in 1,000 Hz to 4,000 Hz.

Figure 13A:
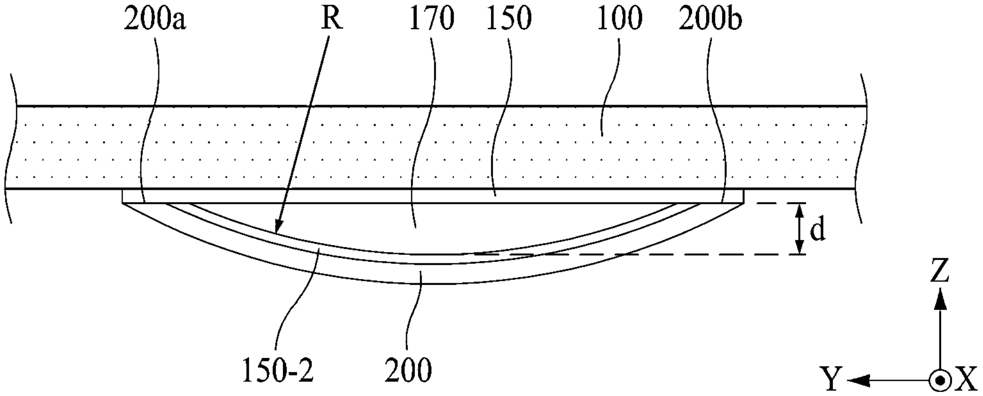
FIG. 13A illustrates an example where a vibration apparatus is coupled to a rear surface of a vibration member according to an embodiment of the present disclosure.
Figure 13B:
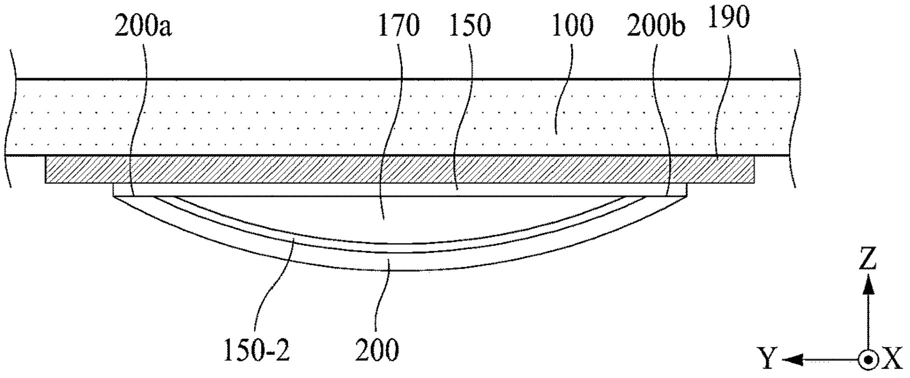
FIG. 13B illustrates an example where a secondary vibration member is added to a structure of FIG. 13A.
Figure 13C:
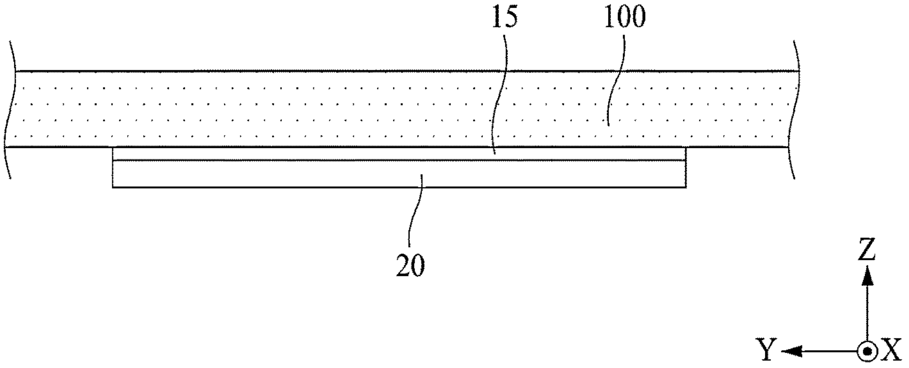
FIG. 13C illustrates an example where a vibration apparatus is coupled to a rear surface of a vibration member according to an experiment example.
Figure 13D:
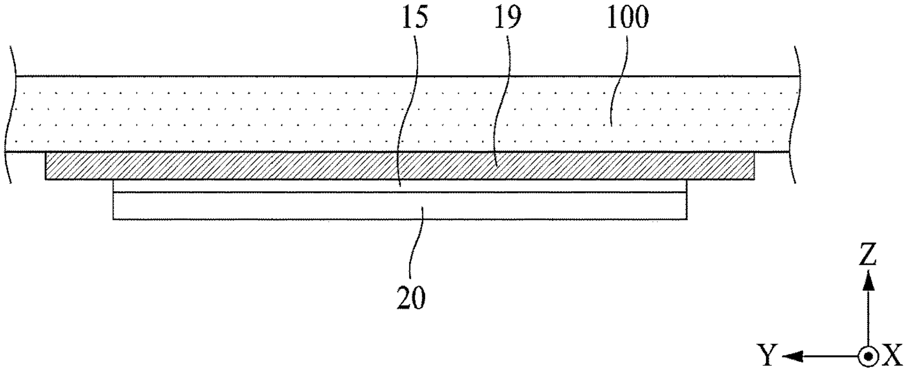
FIG. 13D illustrates an example where a secondary vibration member is added to a structure of the experiment example of FIG. 13C.

FIG. 13A illustrates an example where a vibration apparatus is coupled to a rear surface of a vibration member according to an embodiment of the present disclosure, FIG. 13B illustrates an example where a secondary vibration member is added to a structure of FIG. 13A, FIG. 13C illustrates an example where a vibration apparatus is coupled to a rear surface of a vibration member according to an experiment example, and FIG. 13D illustrates an example where a secondary vibration member is added to a structure of the experiment example of FIG. 13C.

Referring to FIG. 13A, an apparatus according to an embodiment of the present disclosure may include a curved supporting member 170 disposed at a rear surface of a vibration member 100 and a vibration apparatus 200 disposed at a rear surface of the curved supporting member 170. The apparatus may include a first connection member 150 between the curved supporting member 170 and a secondary vibration member 190 and a second connection member 150-2 between the curved supporting member 170 and the vibration apparatus 200. Here, a first surface, which is adjacent to the vibration apparatus 200, of the curved supporting member 170 may be prepared to include a curved surface having a certain curvature "R" in a second direction or a Y direction, and thus, the vibration apparatus 200 disposed at the first surface of the curved supporting member 170 may be disposed at the first surface of the curved supporting member 170 in a state where the vibration apparatus 200 is bent to have bending or flexing corresponding to the first surface of the supporting member 170. In FIG. 13A, the curved supporting member 170 has been prepared to include acrylonitrile-butadiene-styrene (ABS).

Referring to FIG. 13B, an apparatus according to an embodiment of the present disclosure may include a secondary vibration member 190 disposed at a rear surface of a vibration member 100, a curved supporting member 170 disposed at a rear surface of the secondary vibration member 190, and a vibration apparatus 200 disposed at a rear surface of the curved supporting member 170. The apparatus may include a first connection member 150 between the curved supporting member 170 and the secondary vibration member 190 and a second connection member 150-2 between the curved supporting member 170 and the vibration apparatus 200. Here, a first surface, which is adjacent to the vibration apparatus 200, of the curved supporting member 170 may be prepared to include a curved surface having a certain curvature "R" in a second direction or a Y direction, and thus, the vibration apparatus 200 disposed at the first surface of the curved supporting member 170 may be disposed at the first surface of the curved supporting member 170 in a state where the vibration apparatus 200 is bent to have bending or flexing corresponding to the first surface of the supporting member 170. In FIG. 13B, the curved supporting member 170 has been prepared to include acrylonitrile-butadiene-styrene (ABS), and the secondary vibration member 190 has been prepared to include one of polyethylene terephthalate (PET), acrylonitrile-butadiene-styrene (ABS), and aluminum (Al). In a case where the secondary vibration member 190 has been prepared to include polyethylene terephthalate (PET), a thickness of the secondary vibration member 190 has been prepared to 0.2 mm, and a width and a length thereof have been prepared to 150×150 mm. In a case where the secondary vibration member 190 has been prepared to include acrylonitrile-butadiene-styrene (ABS), a thickness of the secondary vibration member 190 has been prepared to 0.5 mm, and a width and a length thereof have been prepared to 150×150 mm. In a case where the secondary vibration member 190 has been prepared to include aluminum (Al), a thickness of the secondary vibration member 190 has been prepared to 0.15 mm, and a width and a length thereof have been prepared to 170×250 mm. However, in the specification, a dimension of the secondary vibration member 190 is not limited thereto.

Referring to FIG. 13C, an apparatus according to an embodiment of the present disclosure may include a vibration member 100 and a vibration apparatus 20 disposed at a rear surface of the vibration member 100, and moreover, may include a connection member 15 between the vibration member 100 and the vibration apparatus 20.

Referring to FIG. 13D, an apparatus according to an experiment example of the present disclosure may include a vibration member 100, a secondary vibration member 19 disposed at a rear surface of the vibration member 100, and a vibration apparatus 20 disposed at a rear surface of the secondary vibration member 19, and moreover, may include a connection member 15 between the secondary vibration member 19 and the vibration apparatus 20. In FIG. 13D, the secondary vibration member 19 has been prepared to include one of polyethylene terephthalate (PET), acrylonitrile-butadiene-styrene (ABS), and aluminum (Al).

Figure 14:
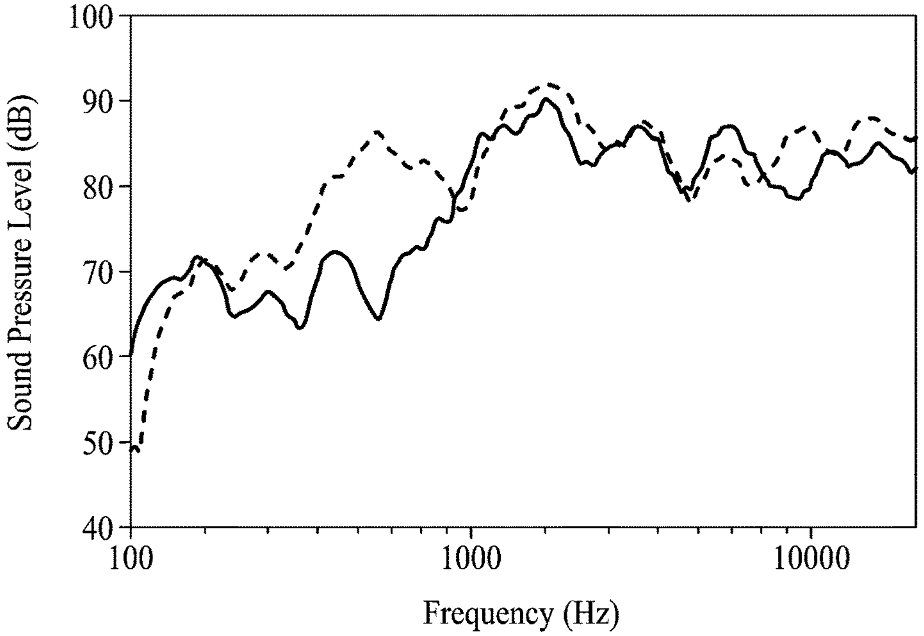
FIG. 14 illustrates a sound pressure level with respect to a frequency, in an apparatus of FIGS. 13A and 13C.

FIG. 14 illustrates a sound pressure level with respect to a frequency, in an apparatus of FIGS. 13A and 13C.

A measurement method of measuring a sound output characteristic may be the same as details described above with reference to FIG. 12, and thus, its description is omitted.

In FIG. 14, the abscissa axis represents a frequency (Hz), and the ordinate axis represents a sound pressure level (SPL) (dB). A dotted line of FIG. 14 represents a sound output characteristic of an apparatus of FIG. 13A, and a solid line represents a sound output characteristic of FIG. 13C.

Referring to FIG. 14, comparing with the solid line, in the dotted line, it may be seen that a sound pressure level is enhanced in an interval of 200 Hz to 900 Hz. For example, comparing with the solid line, in the dotted line, it may be seen that a sound pressure level is enhanced in a middle-low-pitched sound band. For example, comparing with the solid line, in the dotted line, it may be seen that a sound pressure level is measured to be high in 100 Hz to 20 kHz. For example, comparing with the solid line, in the dotted line, it may be seen that a sound pressure level is averagely enhanced by about 10 dB in 100 Hz to 1,000 Hz and is enhanced by about 14 dB in a maximum of 400 Hz. For example, it may be seen that a sound pressure level is averagely enhanced by about 4 dB in 1,000 Hz to 4,000 Hz.

Referring to FIG. 14, the apparatus according to an embodiment of the present disclosure prepared by FIG. 13A may include a curved supporting member 170, including a first surface formed as a curved surface adjacent to a vibration apparatus 200, and the vibration apparatus 200 which has bending or flexing corresponding to the first surface of the curved supporting member 170. Accordingly, comparing with the apparatus of the experiment example including a structure of the flat vibration apparatus 20, it may be observed that a sound pressure level is enhanced by a maximum of 20 dB in an interval of 200 Hz to 900 Hz.

Figure 15:
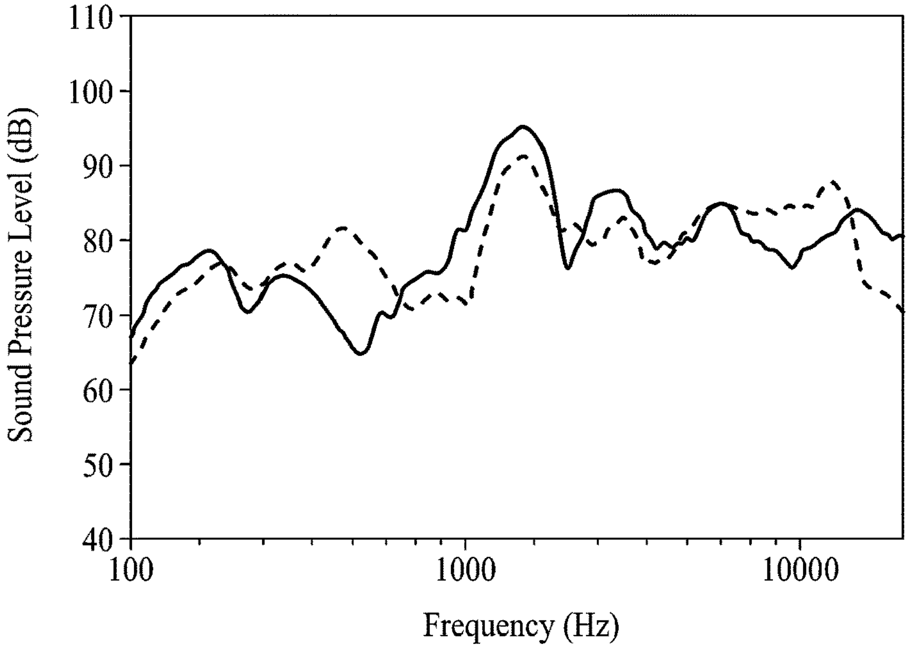
FIG. 15 illustrates a sound pressure level with respect to a frequency, in an apparatus of FIGS. 13B and 13C.

FIG. 15 illustrates a sound pressure level with respect to a frequency, in an apparatus of FIGS. 13B and 13C.

A measurement method of measuring a sound output characteristic may be the same as details described above with reference to FIG. 12, and thus, its description is omitted.

In FIG. 15, the abscissa axis represents a frequency (Hz (hertz)), and the ordinate axis represents a sound pressure level (SPL) (dB (decibel)). A dotted line of FIG. 15 represents a sound output characteristic of an apparatus of FIG. 13B, and a solid line represents a sound output characteristic of FIG. 13C.

In FIG. 15, the secondary vibration member 190 of the apparatus of FIG. 13B has been prepared to include polyethylene terephthalate (PET).

Referring to FIG. 15, comparing with the solid line, in the dotted line, it may be seen that a sound output characteristic is enhanced in about 300 Hz to 600 Hz and about 6,000 Hz to 10,500 Hz. For example, comparing with the solid line, in the dotted line, it may be seen that a total sound output characteristic is flattened. For example, comparing with the solid line, in the dotted line, it may be seen that a sound output characteristic of a low-pitched sound band is enhanced.

Figure 16:
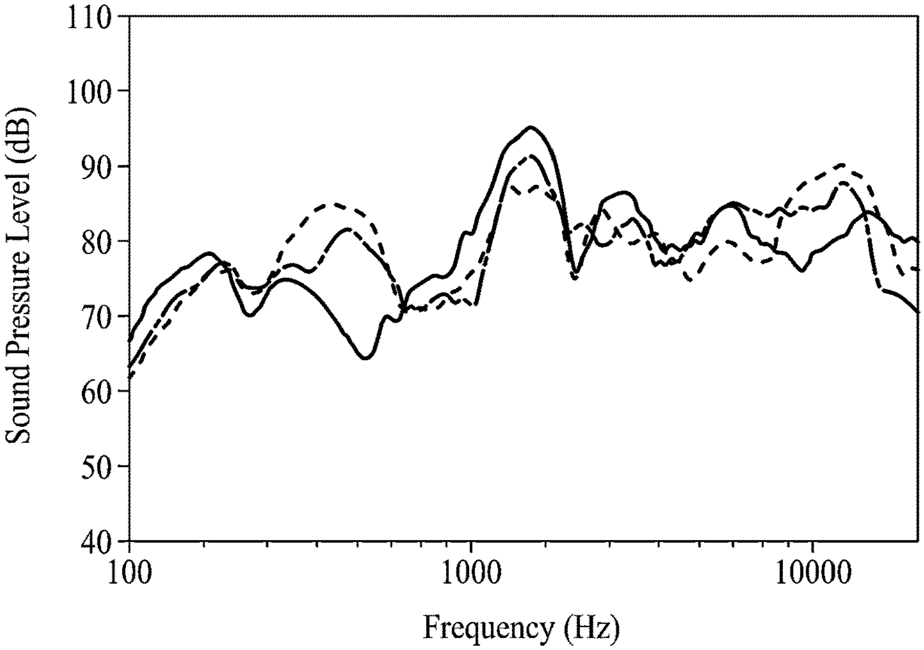
FIG. 16 illustrates a sound pressure level with respect to a frequency, in an apparatus of FIGS. 13B to 13D.

FIG. 16 illustrates a sound pressure level with respect to a frequency, in an apparatus of FIGS. 13B to 13D.

A measurement method of measuring a sound output characteristic may be the same as details described above with reference to FIG. 12, and thus, its description is omitted.

In FIG. 16, the abscissa axis represents a frequency (Hz), and the ordinate axis represents a sound pressure level (SPL) (dB). A dotted line of FIG. 16 represents a sound output characteristic of the apparatus of FIG. 13B, a one-dot-dashed line represents a sound output characteristic of FIG. 13B, and a solid line represents a sound output characteristic of the apparatus of FIG. 13C. The secondary vibration member 190 of the dotted line has been prepared to include ABS, and the secondary vibration member 190 of the one-dot-dashed line has been prepared to include PET.

Referring to FIG. 16, comparing with the solid line, in the dotted line and the one-dot-dashed line, a sound output characteristic of about 200 Hz to 500 Hz is enhanced, and a total sound output characteristic is flattened. For example, comparing with the solid line, in the dotted line and the one-dot-dashed line, it may be seen that a sound output characteristic of a low-pitched sound band is enhanced. Comparing with the one-dot-dashed line, in the dotted line, it may be seen that a sound output characteristic is enhanced by about 2 dB in a range of about 200 Hz to 400 Hz. Accordingly, in a case where the secondary vibration member 190 is prepared to include a material having a high modulus or high stiffness, it may be seen that a sound output characteristic of a low-pitched sound band is enhanced.

Figure 17:
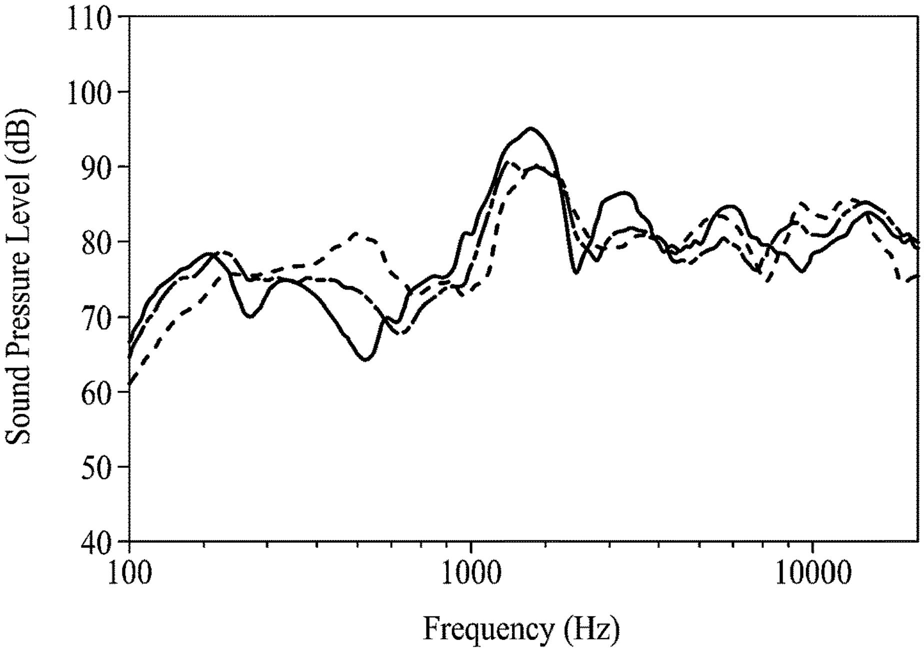
FIG. 17 illustrates a sound pressure level with respect to a frequency, in an apparatus of FIGS. 13B to 13D.

FIG. 17 illustrates a sound pressure level with respect to a frequency, in an apparatus of FIGS. 13B to 13D.

A measurement method of measuring a sound output characteristic may be the same as details described above with reference to FIG. 12, and thus, its description is omitted.

In FIG. 17, the abscissa axis represents a frequency (Hz), and the ordinate axis represents a sound pressure level (SPL) (dB). A dotted line of FIG. 17 represents a sound output characteristic of the apparatus of FIG. 13B, a solid line represents a sound output characteristic of the apparatus of FIG. 13C, and a one-dot-dashed line represents a sound output characteristic of FIG. 13D. A secondary vibration member 190 of the dotted line and a secondary vibration member 190 of the one-dot-dashed line have been prepared to include aluminum.

Referring to FIG. 17, comparing with the one-dot-dashed line, in the dotted line, it may be seen that a sound output characteristic is enhanced in a range of about 200 Hz to 900 Hz. For example, comparing with the one-dot-dashed line, in the dotted line, it may be seen that a sound output characteristic of a low-pitched sound band is enhanced, and it may be seen that a sound output characteristic is enhanced by a maximum of 8 dB in about 400 Hz. For example, comparing with the solid line, in the dotted line and the one-dot-dashed line, it may be seen that a total sound output characteristic is flattened.

A vibration apparatus according to an embodiment of the present disclosure may be applied to a vibration apparatus provided in the apparatus. The apparatus according to an embodiment of the present disclosure may be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display apparatuses, televisions (TVs), wall paper display apparatuses, signage devices, game machines, notebook computers, monitors, cameras, camcorders, home appliances, etc. Also, the vibration apparatus according to the present disclosure may be applied to organic light emitting lighting devices or inorganic light emitting lighting devices. In a case where the vibration apparatus is applied to a lighting device, the vibration apparatus may act as lighting and a speaker. Also, in a case where the vibration apparatus according to the present disclosure is applied to a mobile device, the vibration apparatus may be one or more of a speaker, a receiver, or a haptic, but embodiments of the present disclosure are not limited thereto.

An apparatus according to various embodiments of the present disclosure will be described below.

An apparatus according to various embodiments of the present disclosure may include a vibration member, a vibration apparatus at a rear surface of the vibration member and configured to vibrate the vibration member, and a curved supporting member between the vibration member and the vibration apparatus, the curved supporting member may include a first surface adjacent to the vibration apparatus and a second surface opposite to the first surface, and the first surface includes a curved surface.

According to various embodiments of the present disclosure, the second surface may comprise a surface which differs from the first surface.

According to various embodiments of the present disclosure, the first surface of the curved supporting member may have a curvature of 300R to 4,000R.

According to various embodiments of the present disclosure, a distance between the first surface and the second surface may have a maximum distance at a center portion of the curved supporting member.

According to various embodiments of the present disclosure, the maximum distance may have a distance of 0.45 mm to 6 mm.

According to various embodiments of the present disclosure, a distance between the first surface and the second surface may have a distance which is progressively reduced from the maximum distance in a direction distancing from a center in a first direction.

According to various embodiments of the present disclosure, the distance between the first surface and the second surface may have a constant distance in a second direction different from the first direction.

According to various embodiments of the present disclosure, the vibration apparatus may comprise a vibration portion formed in a continuous structure in the first direction.

According to various embodiments of the present disclosure, the apparatus may further include a secondary vibration member between the vibration member and the curved supporting member.

According to various embodiments of the present disclosure, the secondary vibration member may dissipate heat generated from the vibration member and reinforce a mass of the vibration member.

According to various embodiments of the present disclosure, the vibration apparatus may have a shape corresponding to a curvature of the first surface of the curved supporting member.

According to various embodiments of the present disclosure, a first lateral surface and a second lateral surface of the vibration apparatus may be parallel to a rear surface of the vibration member.

According to various embodiments of the present disclosure, the apparatus may further include a first connection member between the vibration member and the curved supporting member.

According to various embodiments of the present disclosure, a first lateral surface and a second lateral surface of the vibration apparatus may contact the first connection member.

According to various embodiments of the present disclosure, the first connection member may include a hollow portion.

According to various embodiments of the present disclosure, the apparatus may further include a second connection member between the curved supporting member and the vibration apparatus.

According to various embodiments of the present disclosure, the vibration apparatus may include a vibration portion, a first electrode portion on a first surface of the vibration portion, and a second electrode portion on a surface differing from the first surface of the vibration portion.

According to various embodiments of the present disclosure, the vibration apparatus may include a first cover member at the first electrode portion, and a second cover member at the second electrode portion.

According to various embodiments of the present disclosure, the apparatus may further include a first adhesive layer between the first cover member and the first electrode portion, and a second adhesive layer between the second cover member and the second electrode portion.

According to various embodiments of the present disclosure, the vibration portion may include an inorganic material portion having a piezoelectric characteristic.

According to various embodiments of the present disclosure, the vibration portion may include a plurality of inorganic material portions having a piezoelectric characteristic, and an organic material portion between the plurality of inorganic material portions.

According to various embodiments of the present disclosure, the vibration member may include a first region and a second region, and the vibration apparatus may include a first vibration apparatus at the first region and a second vibration apparatus at the second region.

According to various embodiments of the present disclosure, the vibration apparatus may include two or more vibration generators, and the two or more vibration generators may be configured to vibrate in the same direction.

According to various embodiments of the present disclosure, the vibration member may include a metal material, or comprises a single nonmetal or composite nonmetal material including one or more of wood, rubber, plastic, glass, fiber, cloth, paper, and leather.

According to various embodiments of the present disclosure, the vibration member may include one or more of a display panel including a plurality of pixels configured to display an image, a light emitting diode lighting panel, an organic light emitting diode lighting panel, and an inorganic light emitting diode lighting panel.

According to various embodiments of the present disclosure, the vibration member may include one or more of a display panel including a pixel configured to display an image, a screen panel on which an image is to be projected from a display apparatus, a lighting panel, a signage panel, a vehicular interior material, a vehicular window, a vehicular exterior material, a ceiling material of a building, an interior material of a building, a window of a building, an interior material of an aircraft, a window of an aircraft, metal, wood, rubber, plastic, glass, fiber, cloth, paper, leather, and mirror.

In the apparatus according to the embodiments of the present disclosure, because a vibration apparatus for vibrating a display panel or a vibration member is provided, a sound may be generated so that the sound travels toward a front surface of the display panel or the vibration member.

An apparatus according to the embodiments of the present disclosure may include a curved supporting member disposed between the vibration apparatus and the vibration member, the curved supporting member may be implemented as a curved surface having a certain curvature, and the vibration apparatus may include a certain curved surface, and thus, a stress component and/or a vibration component "$d_{31}$" and "$d_{33}$" occurring in the vibration apparatus may affect a vibration member, thereby enhancing a sound pressure level of a middle-low-pitched sound band.

In the apparatus according to the embodiments of the present disclosure, the low-pitched sound band, middle-low-pitched sound band, middle-pitched sound band, and high-pitched sound band characteristic of a sound generated based on a displacement of a vibration plate may be enhanced.

It will be apparent to those skilled in the art that various modifications and variations can be made in the apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. An apparatus, comprising:
- a vibration member;
- a vibration apparatus at a rear surface of the vibration member and configured to vibrate the vibration member; and
- a curved supporting member between the vibration member and the vibration apparatus,
- wherein the curved supporting member comprises a first surface adjacent to the vibration apparatus and a second surface opposite to the first surface, and the first surface includes a curved surface, and
- wherein the second surface comprises a surface which differs from the first surface.

2. The apparatus of claim 1, wherein the first surface of the curved supporting member has a curvature of 300R to 4,000R.

3. The apparatus of claim 1, wherein a distance between the first surface and the second surface has a maximum distance at a center portion of the curved supporting member.

4. The apparatus of claim 3, wherein the maximum distance has a distance of 0.45 mm to 6 mm.

5. The apparatus of claim 3, wherein a distance between the first surface and the second surface has a distance which is progressively reduced from the maximum distance in a direction distancing from a center in a first direction.

6. The apparatus of claim 5, wherein the distance between the first surface and the second surface has a constant distance in a second direction different from the first direction.

7. The apparatus of claim 5, wherein the vibration apparatus comprises a vibration portion formed in a continuous structure in the first direction.

8. The apparatus of claim 1, further comprising a secondary vibration member between the vibration member and the curved supporting member.

9. The apparatus of claim 8, wherein the secondary vibration member dissipates heat generated from the vibration member and reinforce a mass of the vibration member.

10. The apparatus of claim 1, wherein the vibration apparatus has a shape corresponding to a curvature of the first surface of the curved supporting member.

11. The apparatus of claim 1, wherein a first lateral surface and a second lateral surface of the vibration apparatus are parallel to a rear surface of the vibration member.

12. The apparatus of claim 1, further comprising a first connection member between the vibration member and the curved supporting member.

13. The apparatus of claim 12, wherein a first lateral surface and a second lateral surface of the vibration apparatus contact the first connection member.

14. The apparatus of claim 12, wherein the first connection member includes a hollow portion.

15. The apparatus of claim 1, further comprising a second connection member between the curved supporting member and the vibration apparatus.

16. The apparatus of claim 1, wherein the vibration apparatus comprises:
- a vibration portion;
- a first electrode portion on a first surface of the vibration portion; and
- a second electrode portion on a surface differing from the first surface of the vibration portion.

17. The apparatus of claim 16, wherein the vibration apparatus comprises:
- a first cover member at the first electrode portion; and
- a second cover member at the second electrode portion.

18. The apparatus of claim 17, further comprising:
- a first adhesive layer between the first cover member and the first electrode portion; and
- a second adhesive layer between the second cover member and the second electrode portion.

19. The apparatus of claim 18, wherein the vibration portion comprises an inorganic material portion having a piezoelectric characteristic.

20. The apparatus of claim 18, wherein the vibration portion comprises:
- a plurality of inorganic material portions having a piezoelectric characteristic; and an organic material portion between the plurality of inorganic material portions.

21. The apparatus of claim 1, wherein the vibration member comprises a first region and a second region, and the vibration apparatus comprises a first vibration apparatus at the first region and a second vibration apparatus at the second region.

22. The apparatus of claim 1, wherein the vibration apparatus comprises two or more vibration generators, and the two or more vibration generators are configured to vibrate in the same direction.

23. The apparatus of claim 1, wherein the vibration member comprises a metal material, or comprises a single nonmetal or composite nonmetal material including one or more of wood, rubber, plastic, glass, fiber, cloth, paper, and leather.

24. The apparatus of claim 1, wherein the vibration member comprises one or more of a display panel including a plurality of pixels configure to display an image, a light emitting diode lighting panel, an organic light emitting diode lighting panel, and an inorganic light emitting diode lighting panel.

25. The apparatus of claim 1, wherein the vibration member comprises one or more of a display panel including a pixel configured to display an image, a screen panel on which an image is to be projected from a display apparatus, a lighting panel, a signage panel, a vehicular interior material, a vehicular window, a vehicular exterior material, a ceiling material of a building, an interior material of a building, a window of a building, an interior material of an aircraft, a window of an aircraft, metal, wood, rubber, plastic, glass, fiber, cloth, paper, leather, and mirror.

* * * * *